(12) United States Patent
Jiang et al.

(10) Patent No.: US 12,478,176 B2
(45) Date of Patent: Nov. 25, 2025

(54) MULTIFUNCTIONAL ELECTRIC BRUSH HEAD

(71) Applicant: Shangjia (Shenzhen) Technology Co., Ltd., Shenzhen (CN)

(72) Inventors: Wenjuan Jiang, Dazhou (CN); Jiawen Mao, Chengdu (CN)

(73) Assignee: Shangjia (Shenzhen) Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/926,174

(22) Filed: Oct. 24, 2024

(65) Prior Publication Data
US 2025/0072595 A1 Mar. 6, 2025

Related U.S. Application Data

(63) Continuation-in-part of application No. 18/773,809, filed on Jul. 16, 2024, which is a continuation-in-part
(Continued)

(51) Int. Cl.
*A46B 13/02* (2006.01)
*A46B 5/00* (2006.01)
*A46B 7/04* (2006.01)

(52) U.S. Cl.
CPC .......... *A46B 13/02* (2013.01); *A46B 5/005* (2013.01); *A46B 5/0083* (2013.01); *A46B 7/042* (2013.01)

(58) Field of Classification Search
CPC ... A61C 17/224; A61C 17/225; A46B 5/0095; A46B 15/0036; A46B 13/02
See application file for complete search history.

(56) References Cited

U.S. PATENT DOCUMENTS

| | | | |
|---|---|---|---|
| 10,244,907 B2 | 4/2019 | Jang et al. | |
| 2004/0237228 A1 | 12/2004 | King et al. | |

(Continued)

FOREIGN PATENT DOCUMENTS

| | | | |
|---|---|---|---|
| CN | 108056837 A | | 5/2018 |
| DE | 202022105566 U1 | * | 11/2022 |
| KR | 20190094700 A | * | 2/2018 |

OTHER PUBLICATIONS

U.S. Appl. No. 18/459,284—Final Office Action mailed on Jan. 11, 2024, 8 pages.
(Continued)

*Primary Examiner* — Shay Karls
(74) *Attorney, Agent, or Firm* — Getech Law LLC; Jun Ye

(57) ABSTRACT

A multifunctional electric brush head is provided, which includes a control part, an execution part, a fixing component, and a work brush head; the control part rotates relativity to the execution part, the execution part rotates itself; thus, a wide clean range can be achieved. Different work brush heads can be replaced as needed to achieve a better clean result and work brush heads belonging to different fields can be replaced so as to adapt to a wide work scope. The electric brush head can be handheld to clean a dead angle, and it may be installed with a telescopic rod. It further includes a light to illuminate a to-be-cleaned place. The execution part and the telescopic rod are designed to cooperate with each other to achieve a fix and electrical connection effect, allowing the telescopic rod to also control an operation of the electric brush head.

19 Claims, 24 Drawing Sheets

Related U.S. Application Data of application No. 18/459,284, filed on Aug. 31, 2023, now Pat. No. 12,048,369.

(56) References Cited

U.S. PATENT DOCUMENTS

| | | | |
|---|---|---|---|
| 2017/0100223 A1* | 4/2017 | Silverberg | A61C 17/228 |
| 2021/0106192 A1 | 4/2021 | Chen et al. | |
| 2021/0307887 A1 | 10/2021 | Trentel | |
| 2023/0190432 A1* | 6/2023 | Bloch | A46B 15/0004 15/21.1 |

OTHER PUBLICATIONS

U.S. Appl. No. 18/459,284—Non-Final Office Action mailed on Nov. 22, 2023, 11 pages.
U.S. Appl. No. 18/459,284—Notice of Allowance mailed on Mar. 27. 2024, 5 pages.

* cited by examiner

MULTIFUNCTIONAL ELECTRIC BRUSH HEAD

CROSS-REFERENCE TO RELATED APPLICATIONS

This is a continuation in part of U.S. patent application Ser. No. 18/773,809, filed Jul. 16, 2024, which is a continuation in part of U.S. patent application Ser. No. 18/459,284, filed Aug. 31, 2023, now U.S. Pat. No. 12,048,369 issued Jul. 30, 2024, the entire contents of which are hereby incorporated by reference in their entireties.

TECHNICAL FIELD

The present application relates to the field of electric cleaning tools, and in particular to, a multifunctional electric brush head.

BACKGROUND

With the development of society, people's living standards are getting higher and higher, and electric cleaning tools are becoming more and more widely used in industries, service industries, households, and other places, such as using electric cleaning brushes to clean the ground. However, for some electric cleaning brushes, it can be found that the brush heads of existing cleaning brushes do not have an adjustment function, have dead angles when cleaning, and have single function, limited usage range, poor effectiveness, and insufficient flexibility.

SUMMARY

In order to overcome the above shortcomings, the present application provides a multifunctional electric brush head, aiming to improve the problems in the existing technology.

An embodiment of the present application provides a multifunctional electric brush head, which includes a control part, an execution part, a fixing component, and a work brush head; the control part is rotatably connected to the execution part through the fixing component; the control part is electrically connected to the execution part; the execution part is capably of rotating itself, and the execution part is connected to the work brush head;

where the control part includes a control part fixing-and-connection hole, a light switch key, an electric brush switch key, a solar panel, a waterproof silicone block, a touch display screen, a top charging port, a sound hole, a wiring hole, a charging port inside the silicone block, a voice control module, a power supply, and a control center; the light switch key, electric brush switch key, solar panel, touch display screen, top charging port, charging port inside the silicone block, voice control module, and control center are all electrically connected to the power supply; the light switch key, electric brush switch key, solar panel, touch display screen, top charging port, charging port inside the silicone block, and voice control module are all electrically connected to the control center.

In an embodiment of the present disclosure, the fixing component has elasticity; the fixing component includes a hook, a notch, a rectangular protrusion, and a circular protrusion; the hook is located at a bottom surface of the fixing component; the notch, the rectangular protrusion, and the circular protrusion are located at a side surface of the fixing component.

In an embodiment of the present disclosure, the execution part includes an execution part fixing-and-connection hole, an electric motor, a fix connection element, an execution part lower cover, an execution part body, an execution part upper cover, and a self-rotation limit mechanism; the execution part fixing-and-connection hole is located on the execution part upper cover; the execution part upper cover is fixed on the execution part body; the execution part lower cover is fixed below the execution part body; the electric motor is located in the execution part body and fixed above the execution part lower cover; an output shaft of the electric motor is connected to the fix connection element.

In an embodiment of the present disclosure, the fix connection element includes a bayonet and a positioning flange; the work brush head includes a clamp block, a cavity, and a concave edge; the clamp block is clamp-connection with the bayonet, the cavity accommodates the fix connection element, the concave edge corresponds to the positioning flange; and the work brush head is connected with the fix connection element.

In an embodiment of the present disclosure, the execution part body includes a light, a rotation prompt part, a self-rotation latch, a self-rotation block, and a self-rotation sliding chute; the self-rotation limit mechanism is matched with the self-rotation latch; the execution part upper cover is matched with the self-rotation block and the self-rotation sliding chute, respectively.

In an embodiment of the present disclosure, the self-rotation limit mechanism includes a self-rotation limit button, a self-rotation limit mechanism fix bracket, a spring, and a self-rotation limit clamp block; the fixing component includes a hole on the same side with the self-rotation limit button; the self-rotation limit mechanism is fixed inside the execution part upper cover.

In an embodiment of the present disclosure, the execution part upper cover includes a self-rotation fix block, a self-rotation slide rail, a fix threaded hole of the self-rotation limit mechanism fix bracket, and an accommodation slot of the self-rotation limit clamp block.

In an embodiment of the present disclosure, the self-rotation limit mechanism fix bracket is fixed on the fix threaded hole of the self-rotation limit mechanism fix bracket; the self-rotation limit clamp block is placed by the self-rotation limit mechanism fix bracket and the accommodation slot of the self-rotation limit clamp block together; the spring is located between the self-rotation limit clamp block and the self-rotation limit mechanism fix bracket; the self-rotation slide rail is located inside the self-rotation sliding chute, the self-rotation fix block and the self-rotation block are located on the same horizontal plane, and the self-rotation limit clamp block is engaged with the self-rotation latch.

In an embodiment of the present disclosure, the fix connection element further includes at least one first magnet; and a corresponding position of the work brush head includes at least one second magnet; the first magnet is attracted to the second magnet.

In an embodiment of the present disclosure, the electric brush head includes a telescopic rod; the telescopic rod includes a threaded plug and a button; the threaded plug is electrically connected to the button; the telescopic rod is electrically connected to the control part.

In an embodiment of the present disclosure, the electric brush head includes a charging base; the charging base includes a charging port and a recess.

The present application further provides an electric brush head, which includes a control part, an execution part, a fixing component, a work brush head, and a telescopic rod; the control part is rotatably connected to the execution part through the fixing component; the control part is electrically connected to the execution part; the execution part is capable of rotating itself, and the execution part is connected to the work brush head;

where the control part includes a control part fixing-and-connection hole, a light switch key, an electric brush switch key, a solar panel, a waterproof silicone block, a touch display screen, a top charging port, a sound hole, a wiring hole, a charging port inside the silicone block, a voice control module, a power supply, and a control center; the light switch key, electric brush switch key, solar panel, touch display screen, top charging port, charging port inside the silicone block, voice control module, and control center are all electrically connected to the power supply; the light switch key, electric brush switch key, solar panel, touch display screen, top charging port, charging port inside the silicone block, and voice control module are all electrically connected to the control center;

the telescopic rod includes a threaded plug and a button; the threaded plug is electrically connected to the button; the telescopic rod is electrically connected to the control part;

the execution part includes an execution part fixing-and-connection hole, an electric motor, a fix connection element, an execution part lower cover, an execution part body, an execution part upper cover, and a self-rotation limit mechanism; the execution part fixing-and-connection hole is located on the execution part upper cover; the execution part upper cover is fixed on the execution part body; the execution part lower cover is fixed below the execution part body; the electric motor is located in the execution part body and fixed above the execution part lower cover; an output shaft of the electric motor is connected to the fix connection element.

In an embodiment of the present disclosure, the fix connection element includes a slot, the work brush head is provided with a cavity, and the cavity is provided with a hook; when the fix connection element is inserted into the cavity, the hook is inserted into the slot; or the work brush head is provided a cavity, and a top surface of the cavity is provided a buckle; when the fix connection element is inserted into the cavity, the buckle abuts against a bottom surface of the fix connection element.

In an embodiment of the present disclosure, the fix connection element is provided with an insertion slot, the work brush head is provided with an insertion block, the insertion block is inserted into the insertion slot and is interference fit with the insertion slot.

In an embodiment of the present disclosure, the electric brush head further includes a fix threaded rod, the fix connection element is provided with an insertion slot, the work brush head is provided with an insertion block, the insertion block is inserted into the insertion slot; a slot wall of the insertion slot and the insertion block are both provided with a threaded hole, and the fixed threaded rod is threaded connected to the threaded hole on the slot wall of the insertion slot and the threaded hole on the insertion block.

In an embodiment of the present disclosure, the fix connection element is provided with an iron block, the work brush head is provided with a magnet, and the magnet is magnetically attracted to the iron block; or an outer surface of the fix connection element is provided with a thread, the work brush head is provided with a threaded hole; the fix connection element is threaded connected to the threaded hole.

In an embodiment of the present disclosure, the fix connection element is fixedly connected to the work brush head through a rotating buckle or Velcro.

In an embodiment of the present disclosure, the fix connection element is provided with an accommodation slot, the accommodation slot includes an opening, the work brush head is provided with a spherical buckle, and the spherical buckle is clamped into the accommodation slot.

In an embodiment of the present disclosure, the fix connection element is fixedly connected to the work brush head through an elbow tube; or the work brush head is directly sleeved on the fix connection element.

In an embodiment of the present disclosure, the fix connection element is connected to the work brush head through an elastic connector.

Compared with the prior art, the beneficial effect of the present application is that, different from the prior art, the present application provides a multifunctional electric brush head, which includes a control part, an execution part, a fixing component, and a work brush head; a relative rotation between the control part and the execution part, and a self-rotation of the execution part; and thus, a large clean range is achieved, different work brush heads can be replaced as needed to achieve a better clean result, and even apply them to different fields, such as adding a weeding work brush head for weeding, adding a fan blade work brush head for producing wind and heat dissipation, etc., and the electric brush head can be held in hand for cleaning work, such as, cleaning a dead angle, and may be installed with a telescopic rod to cope with a general scenario. It can further include a light to illuminate a to-be-cleaned place. At the same time, the execution part and the telescopic rod are designed to cooperate with each other to achieve a fix and electrical connection effect, allowing the telescopic rod to also control an operation of the electric brush head.

BRIEF DESCRIPTION OF DRAWINGS

In order to provide a clearer explanation of the technical solution of the present application, a brief introduction will be given to the drawings required for the embodiment. It should be understood that the following drawings only illustrate some embodiments of the present application, and therefore should not be regarded as limiting the scope. For ordinary technical personnel in the art, other relevant drawings can also be obtained based on these drawings without creative work.

DESCRIPTION OF EMBODIMENTS

The following will describe the technical solution in the embodiment of the present application in combination with the drawings.

Figure 1:
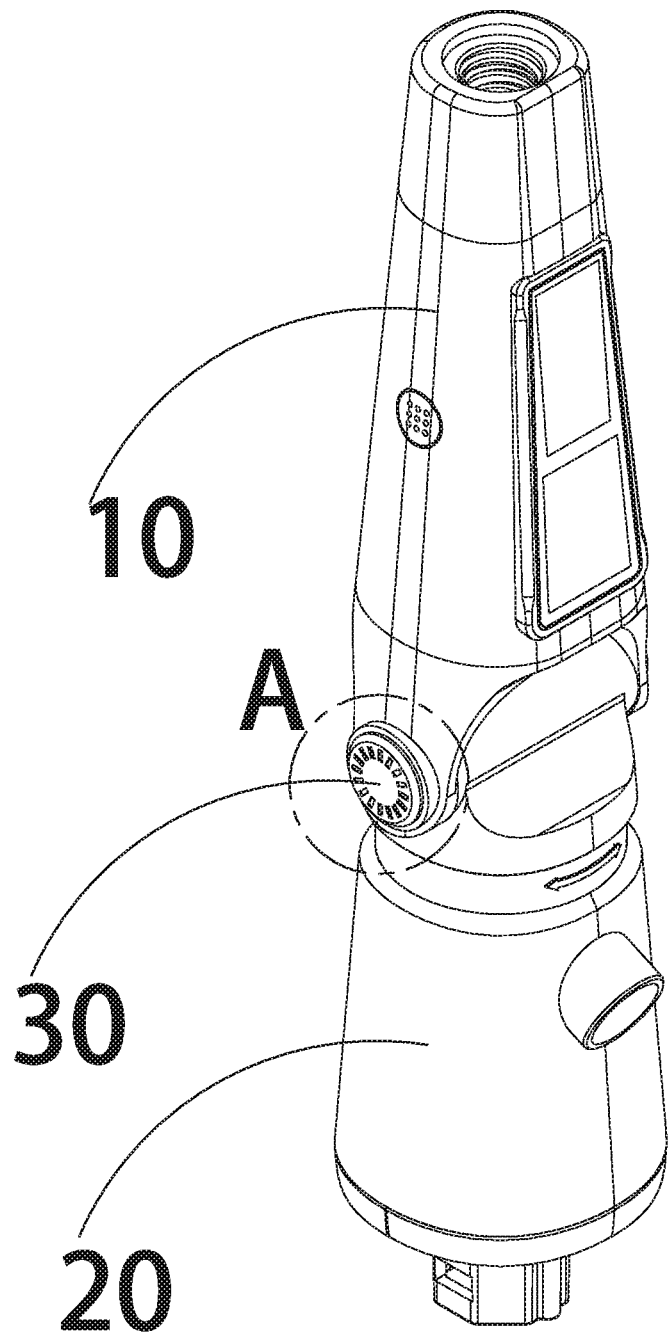
FIG. 1 is a structural schematic diagram of a multifunctional electric brush head provided in an embodiment of the present application.
Figure 2:
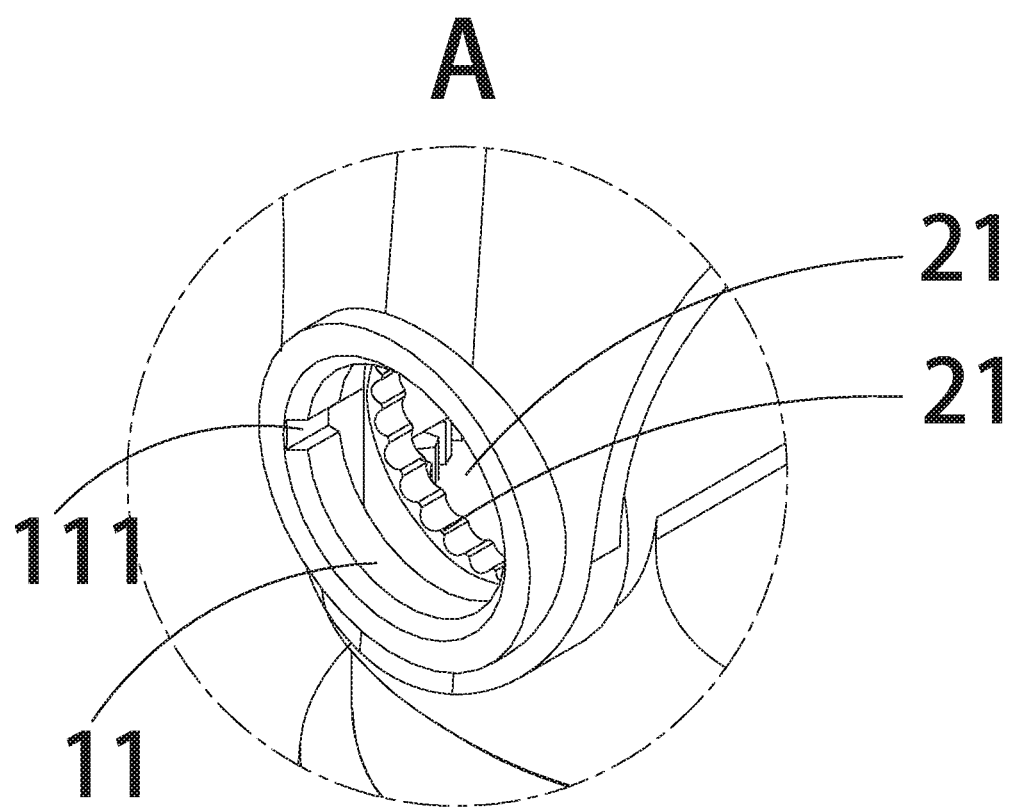
FIG. 2 is a schematic diagram of an inner enlarged structure at position A in FIG. 1.
Figure 3:
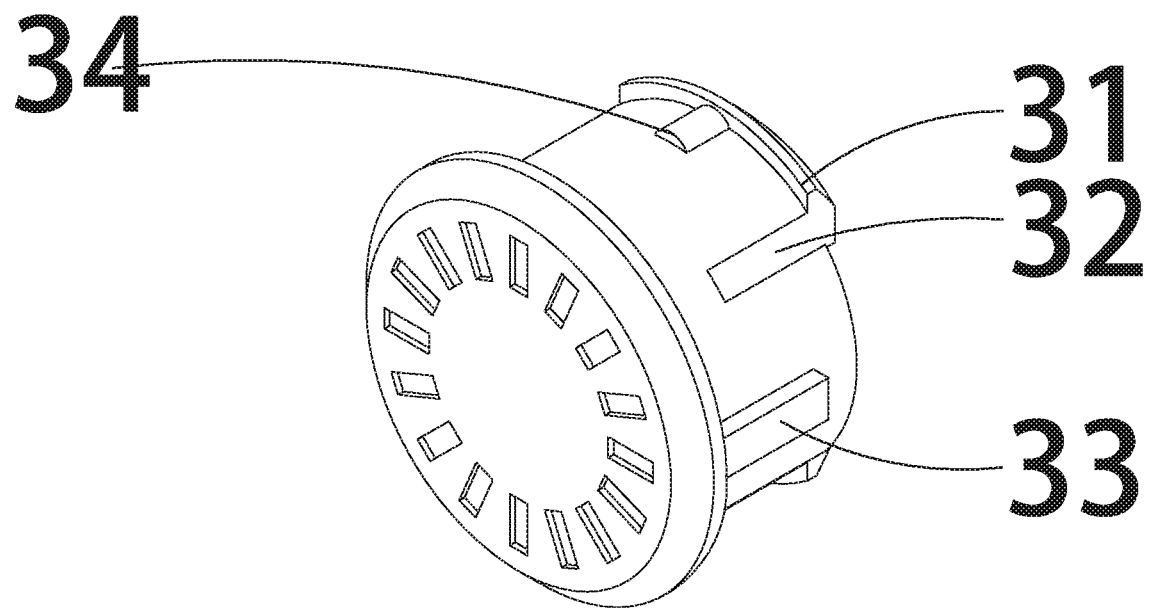
FIG. 3 is a structural schematic diagram of a fixing component provided in an embodiment of the present application.

Please refer to FIGS. 1 to 3. The electric brush head includes a control part 10, an execution part 20, and a fixing component 30; the control part 10 is rotatably connected to the execution part 20 through the fixing component 30, so that the control part 10 and the execution part 20 can rotate and adjust an angle relative to each other.

A bottom of the control part 10 includes a control part fixing-and-connection hole 11, a top of the execution part 20 includes an execution part fixing-and-connection hole 21, the control part fixing-and-connection hole 11 includes a recess 111, and the execution part fixing-and-connection hole 21 includes a latch 211. The fixing component 30 has elasticity, the fixing component 30 includes a hook 31, a notch 32, a rectangular protrusion 33, and a circular protrusion 34. The hook 31 is located at a bottom surface of the fixing component 30, the notch 32, rectangular protrusion 33 and circular protrusion 34 are fixed at a side surface of the fixing component 30. When the control part fixing-and-connection hole 11 coincides with the execution part fixing-and-connection hole 21, due to the fixing component 30 has elasticity, the fixing component 30 can pass through the control part fixing-and-connection hole 11 and the execution part fixing-and-connection hole 21. And the rectangular protrusion 33 is clamped into the recess 111, the circular protrusion 34 is clamped into the latch 211, the hook 31 extends into an interior of the execution part fixing-and-connection hole 21, and the control part 10 is connected to the execution part 20, thereby allowing a relative rotation of the control part 10 and the execution part 20.

Figure 4A:
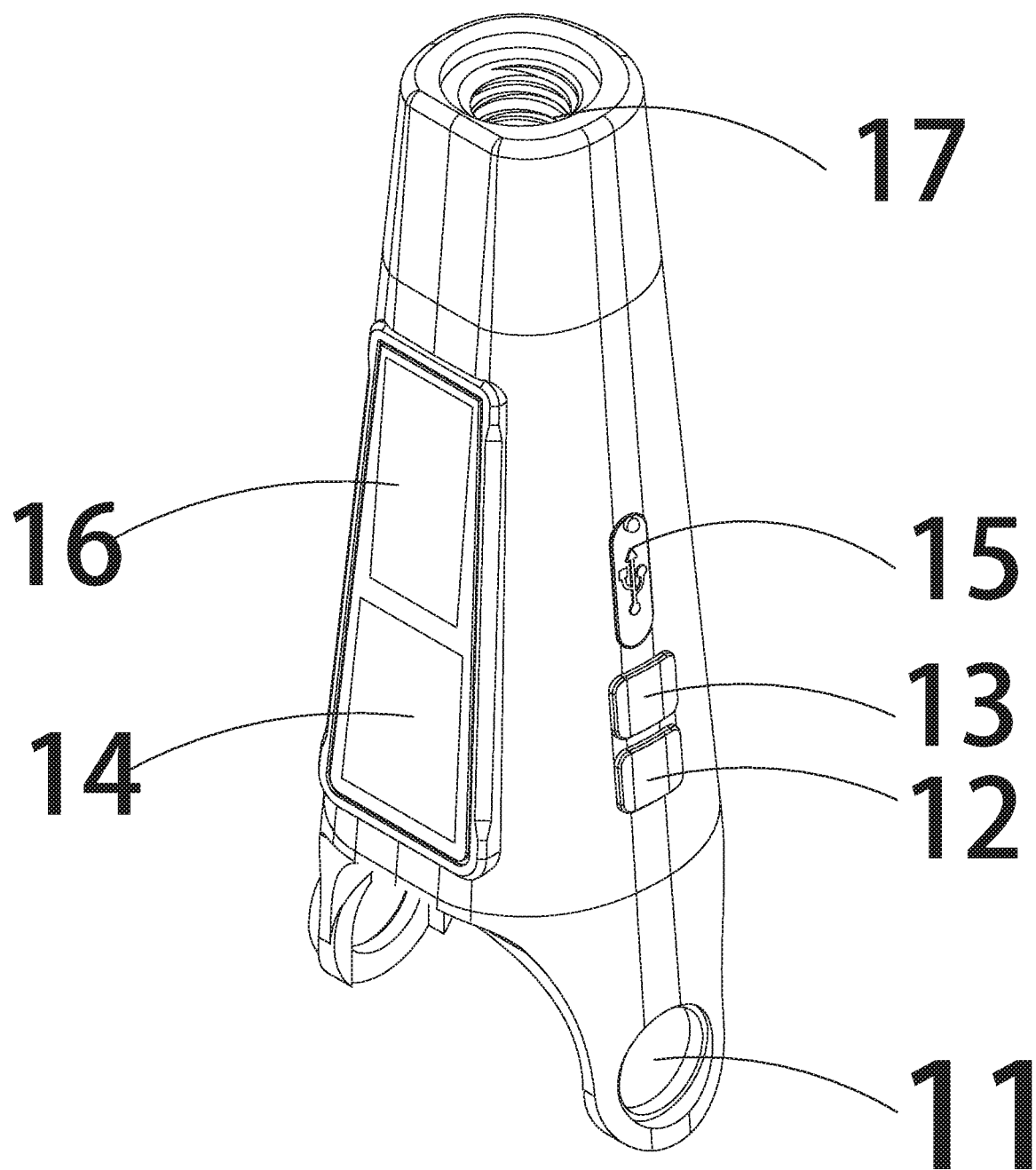
FIG. 4A is a first structural schematic diagram of a control part provided in an embodiment of the present application.
Figure 4B:
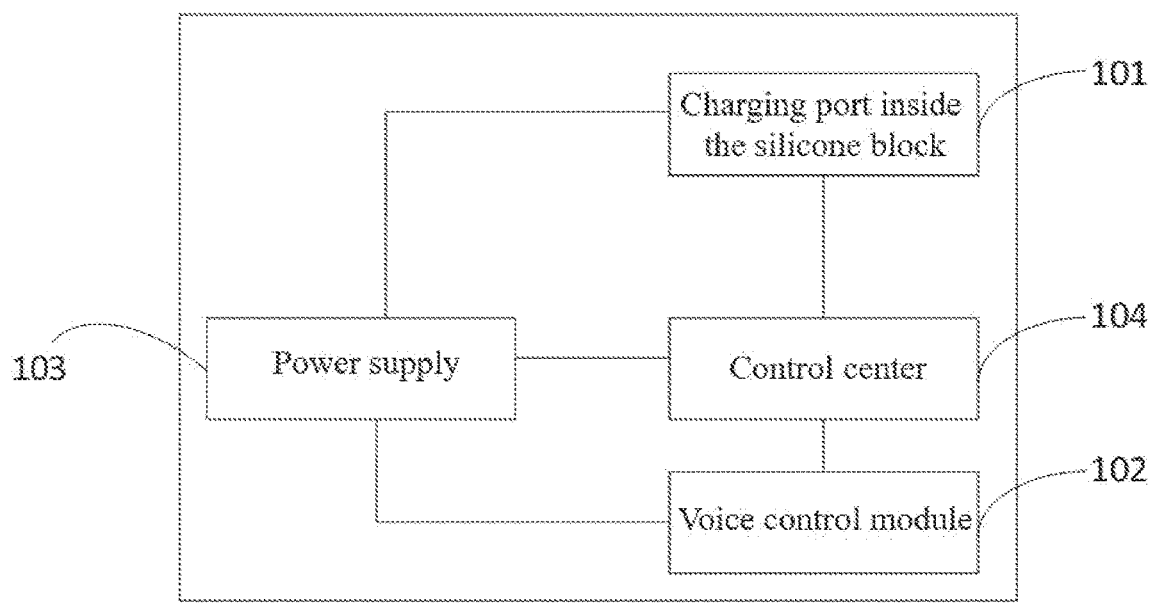
FIG. 4B is a partial structural schematic diagram of the control part provided in an embodiment of the present application.
Figure 5:
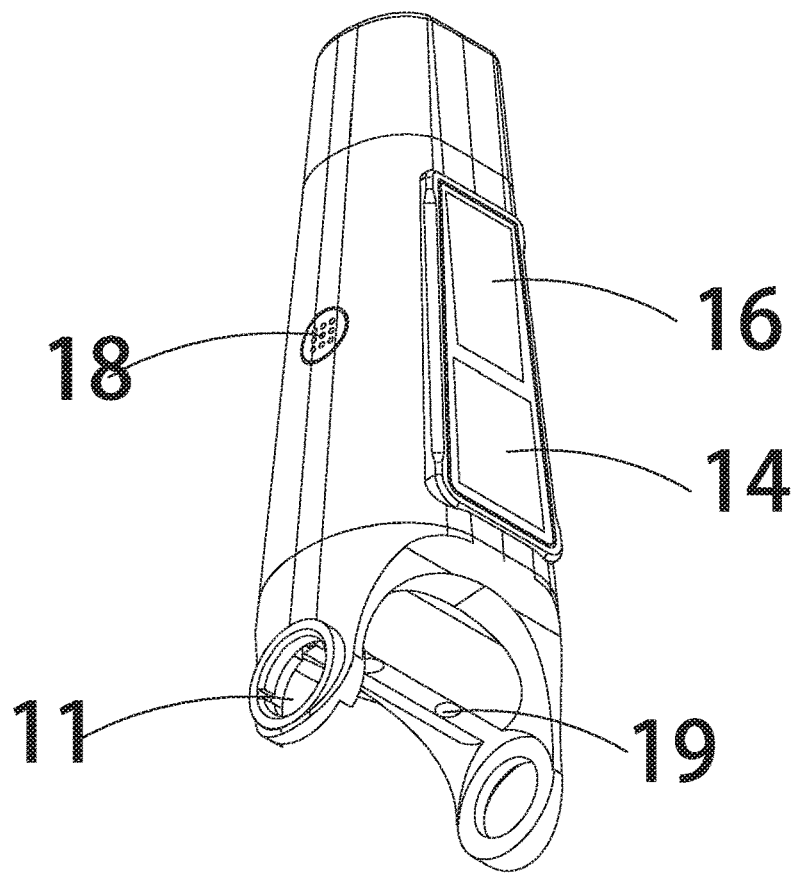
FIG. 5 is a second structural schematic diagram of the control part provided in an embodiment of the present application.

Please refer to FIGS. 4A, 4B and 5. The control part 10 includes a control part fixing-and-connection hole 11, a light switch key 12, an electric brush switch key 13, a solar panel 14, a waterproof silicone block 15, a touch display screen 16, a top charging port 17, a sound hole 18, a wiring hole 19, a charging port inside the silicone block 101, a voice control module 102, a power supply 103 and a control center 104. Where the charging port inside the silicone block 101 is covered by the waterproof silicone block 15, which can be flipped out to expose the charging port inside the silicone block 101.

The light switch key 12, electric brush switch key 13, solar panel 14, touch display screen 16, top charging port 17, charging port inside the silicone block 101, voice control module 102, and control center 104 are all electrically connected to the power supply 103. The light switch key 12, electric brush switch key 13, solar panel 14, touch display screen 16, top charging port 17, charging port inside the silicone block 101, and voice control module 102 are all electrically connected to the control center 104. The control center 104 is an overall control part of the control part 10, responsible for controlling a functional device of the control part 10. The touch display screen 16 displays at least one of a power-on/off state of the electric brush head, a battery status of the electric brush head, a rotation speed of the electric brush head, and a current state of the electric brush head and controls a work state of the electric brush head. The power supply 103 supplies power for the electric brush head device, and the solar panel 14 charges the power supply 103. The voice control module 102 is installed inside the control part 10 corresponding to the sound hole 18, facilitating a reception of sound incoming from the sound hole 18 and controlling the work state of the electric brush head based on the sound. The charging port inside the silicone block 101 may be a type C interface, a USB interface, etc., configured to connect to an external power source for charging.

Please refer to FIGS. 6 to 11. The execution part 20 includes an execution part fixing-and-connection hole 21, an electric motor 22, a fix connection element 23, an execution part lower cover 24, an execution part body 25, an execution part upper cover 26, and a self-rotation limit mechanism 27. The execution part fixing-and-connection hole 21 is located on the execution part upper cover 26. The execution part lower cover 24 is fixed with the electric motor 22. The execution part lower cover 24 is fixed below the execution part body 25 through a screw, allowing the electric motor to be located in the execution part body 25. An output shaft 221 of the electric motor 22 is connected to the fix connection element 23, thereby driving the fix connection element 23 to rotate by the electric motor 22.

The fix connection element 23 includes a bayonet 231, a positioning flange 232, and a first magnet 233. The positioning flange 232 is configured to position, the first magnet 233 is configured to adsorb the work brush head 40, and the bayonet 231 is configured to connect the work brush head 40. Different work brush heads 40 can be replaced on the fix connection element 23 as needed.

The execution part body 25 includes a light 251, a rotation prompt part 252, a self-rotation latch 253, a self-rotation block 254, and a self-rotation sliding chute 255. The light 251 is configured to provide a light source during an operation and illuminate a position that needs to be processed, thereby achieving a better processing result. The rotation prompt part 252 is configured to prompt a rotation direction for a user. The execution part upper cover 26 includes a self-rotation fix block 261, a self-rotation slide rail 262, a fix threaded hole of the self-rotation limit mechanism fix bracket 263, and an accommodation slot of the self-rotation limit clamp block 264. The electric motor 22 and the light 251 are electrically connected to the control part 10, and a connection wire can pass through the wiring hole 19. Thus, the light switch key 12 and the electric brush switch key 13 control work states of the light 251 and the electric motor 22, respectively. And the touch display screen 16 and the voice control module 102 can also control the work states of the light 251 and the electric motor 22.

The self-rotation limit mechanism 27 includes a self-rotation limit button 271, a self-rotation limit mechanism fix bracket 272, a spring 273, and a self-rotation limit clamp block 274. The self-rotation limit mechanism fix bracket 272 is fixed on the fix threaded hole of the self-rotation limit mechanism fix bracket 263 through a screw, and the self-rotation limit clamp block 274 is placed by the self-rotation limit mechanism fix bracket 272 and the accommodation slot of the self-rotation limit clamp block 264 together, facilitating a movement of the self-rotation limit clamp block 274. The spring 273 is located between the self-rotation limit clamp block 274 and the self-rotation limit mechanism fix bracket 272 to assist a reset the self-rotation limit clamp block 274. A hole is included on the fixing component 30 on the same side with the self-rotation limit button 271 to facilitate the self-rotation limit button 271 to pass through, so that the self-rotation limit button 271 comes into contact with the self-rotation limit clamp block 274 and is fixed on the fixing component 30 on the same side with the self-rotation limit clamp block 274, so that the entire self-rotation limit mechanism 27 is fixed in the execution part upper cover 26. The execution part upper cover 26 is installed on the execution part body 25, the self-rotation slide rail 262 is located inside the self-rotation sliding chute 255, the self-rotation fix block 261 and the self-rotation block 254 are located on the same horizontal plane, and a latch on the self-rotation limit clamp block 274 is engaged with the self-rotation latch 253, thereby limiting a rotation of the execution part body 25 by the self-rotation limit mechanism 27.

An entire rotation process is as follows: the execution part upper cover 26 and the self-rotation limit mechanism 27 fixed on the execution part upper cover 26 remain stationary, while the execution part body 25 and components fixed on the execution part body 25 rotate. During the rotation process, the self-rotation slide rail 262 does not move, the self-rotation sliding chute 255 rotates, the self-rotation fix block 261 does not move, and the self-rotation block 254 rotates. When the self-rotation block 254 rotates to contact with the self-rotation fix block 261, it cannot continue to rotate in the same direction; and thus, the self-rotation fix block 261 and the self-rotation block 254 cooperate to limit a rotation angle of the execution part body 25.

An entire operation process of self-rotation is as follows: the self-rotation limit button 271 is pressed, the self-rotation limit clamp block 274 is pushed to move, and the spring 273 is compressed, the latch of the self-rotation limit clamp block 274 is disengaged from the self-rotation latch 253, and the execution part body 25 is rotated until it reaches a suitable angle, the self-rotation limit button 271 is released, and the self-rotation limit clamp block 274 will continue to engage with the self-rotation latch 253 under a reset effect of the spring 273, and thus, the execution part body 25 is fixed.

Figure 12:
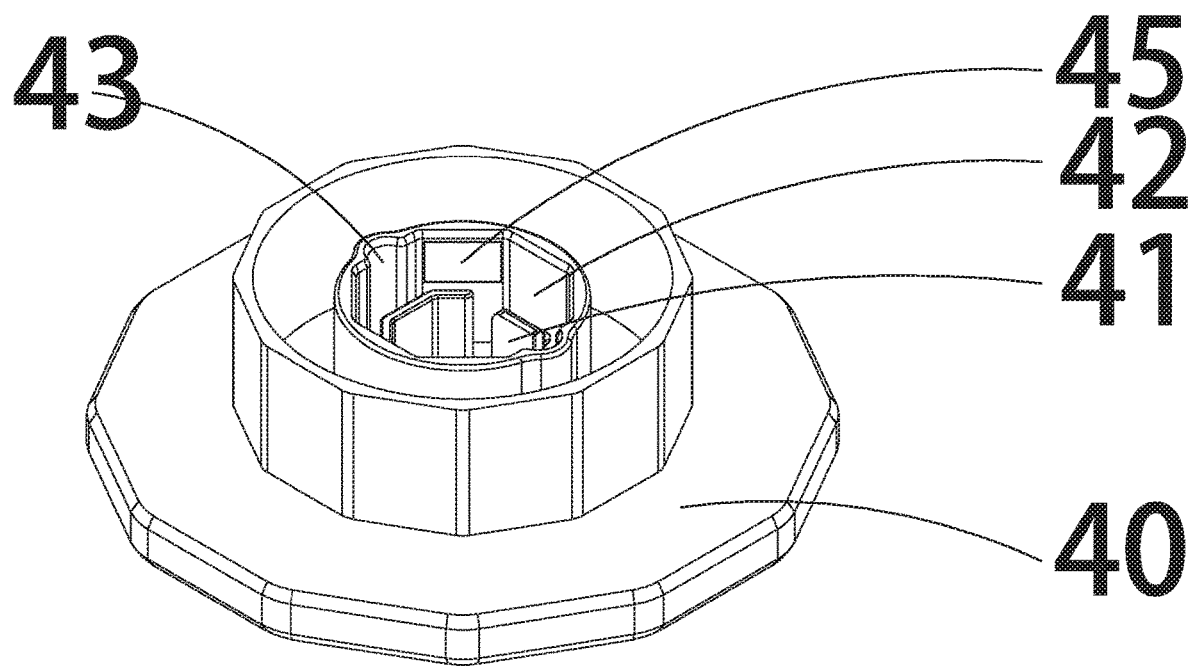
FIG. 12 is a structural schematic diagram of a work brush head provided in an embodiment of the present application.
Figure 13:
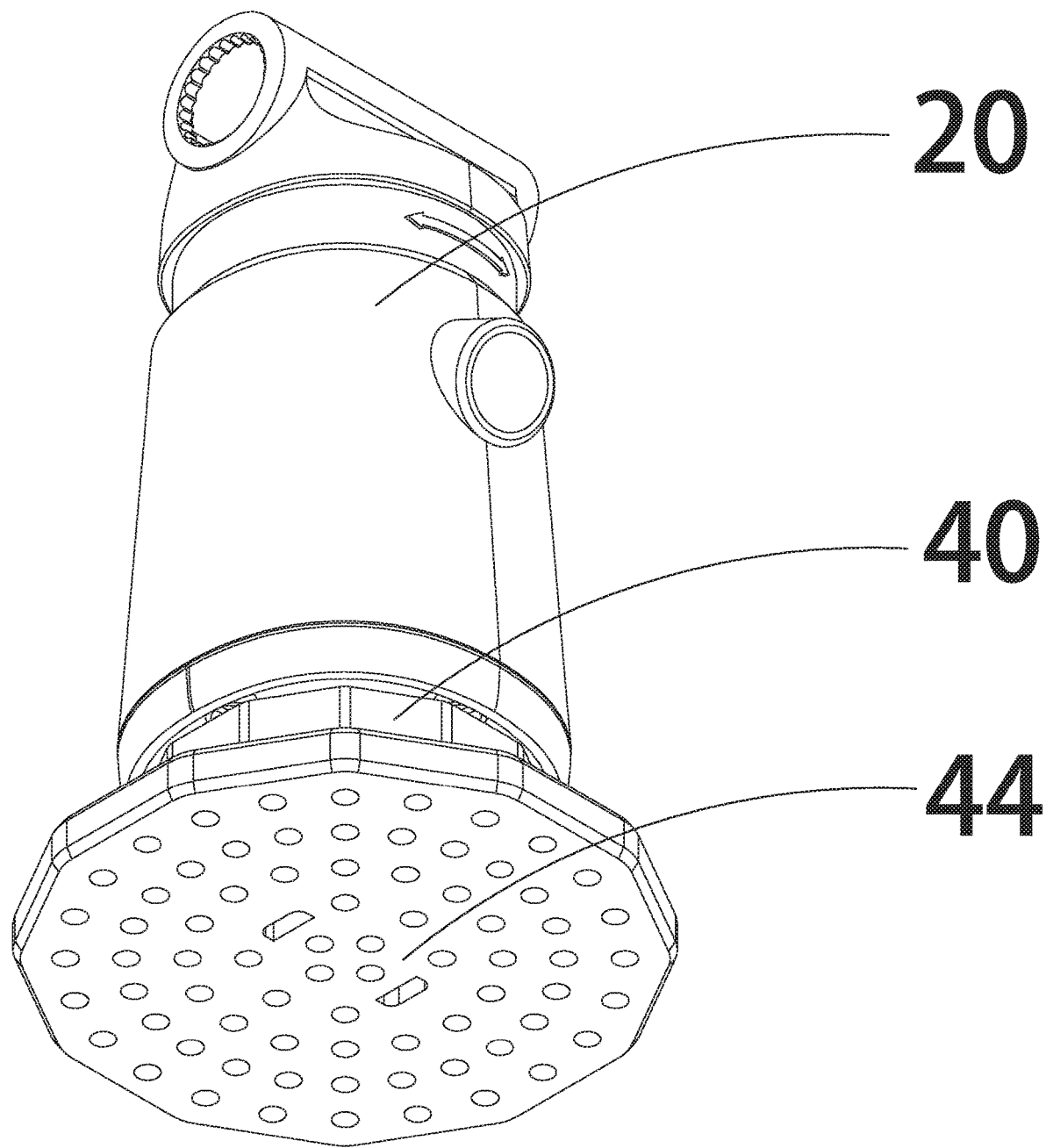
FIG. 13 is a schematic diagram of the execution part being in clamp-connection with the work brush head provided in an embodiment of the present application.

Please refer to FIGS. 12 and 13. The electric brush head includes a work brush head 40, which includes a clamp block 41, a cavity 42, a concave edge 43, and a second magnet 45. The clamp block 41 is clamp-connection with the bayonet 231, and the cavity 42 is configured to accommodate the fix connection element 23. An internal shape of the cavity 42 corresponds to the fix connection element 23, and the concave edge 43 is located on the cavity 42, and a shape of the cavity 42 corresponds to a shape of the positioning flange 232, facilitating a positioning of the fix connection element 23 in the cavity 42, the second magnet 45 is attracted to the first magnet 233 on the fix connection element 23, thereby facilitating a fixation and disassembly of the work brush head 40 and the fix connection element 23. A bottom surface 44 of the work brush head 40 of this type of work brush head is connected and fixed with a Velcro (not shown), and a tool is connected with the Velcro (not shown) to perform a work task.

Figure 14:
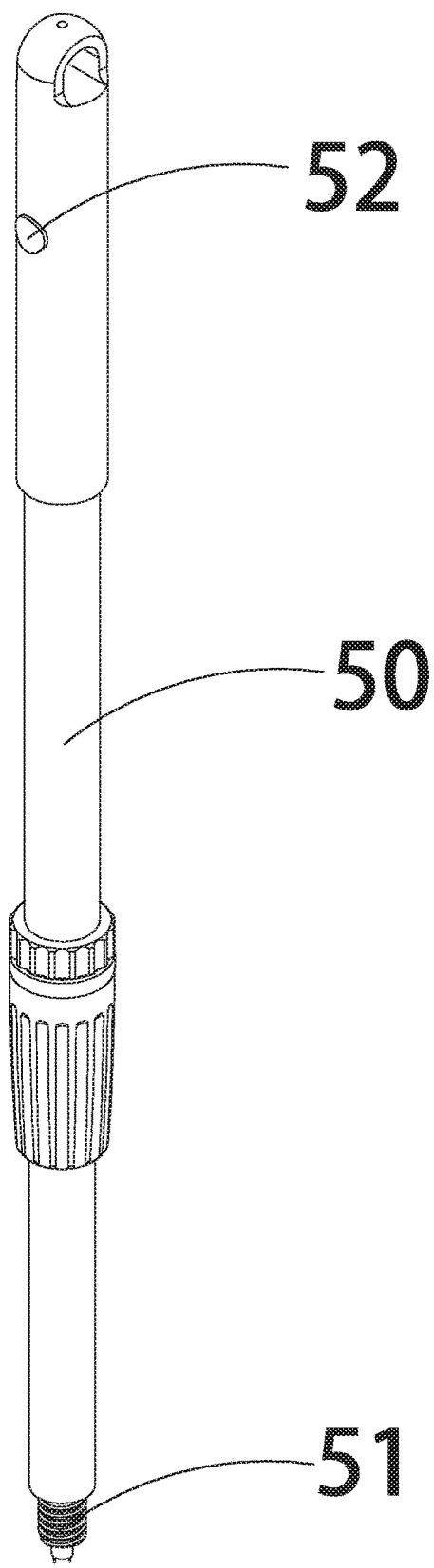
FIG. 14 is a structural schematic diagram of a telescopic rod provided in an embodiment of the present application.
Figure 15:
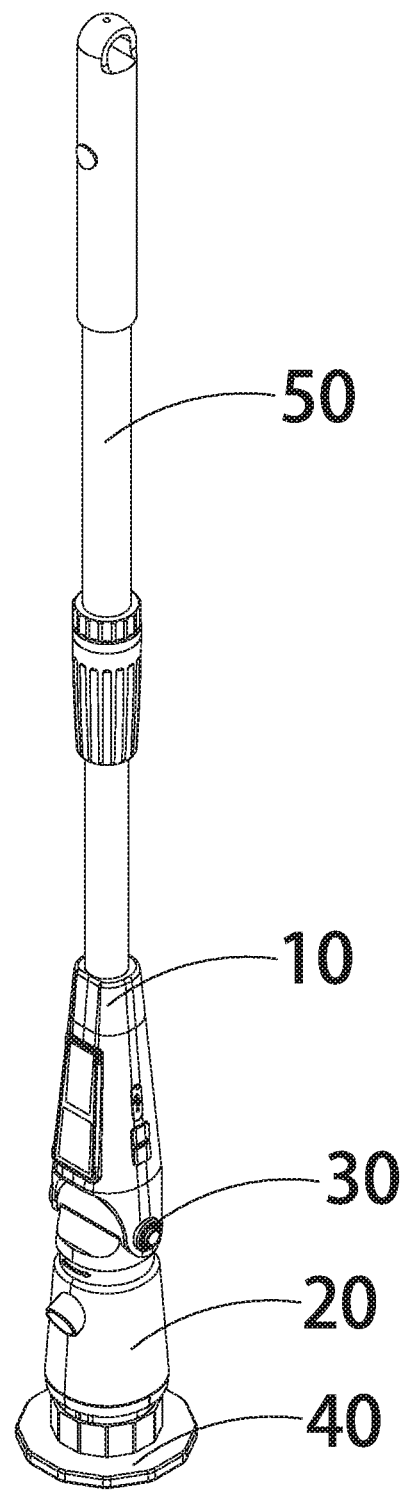
FIG. 15 is a schematic diagram of the telescopic rod being connected to the electric brush head provided in an embodiment of the present application.

Please refer to FIGS. 14 and 15, the electric brush head includes a telescopic rod 50. The telescopic rod 50 itself can be retracted and adjusted, and it is provided with a threaded plug 51 and a button 52. The threaded plug 51 and the button 52 are electrically connected, and the threaded plug 51 is electrically connected to the top charging port 17 of the control part 10, so that the telescopic rod 50 is fixedly connected to the control part 10, and the button 52 can control a work state of the electric brush head.

Figure 16:
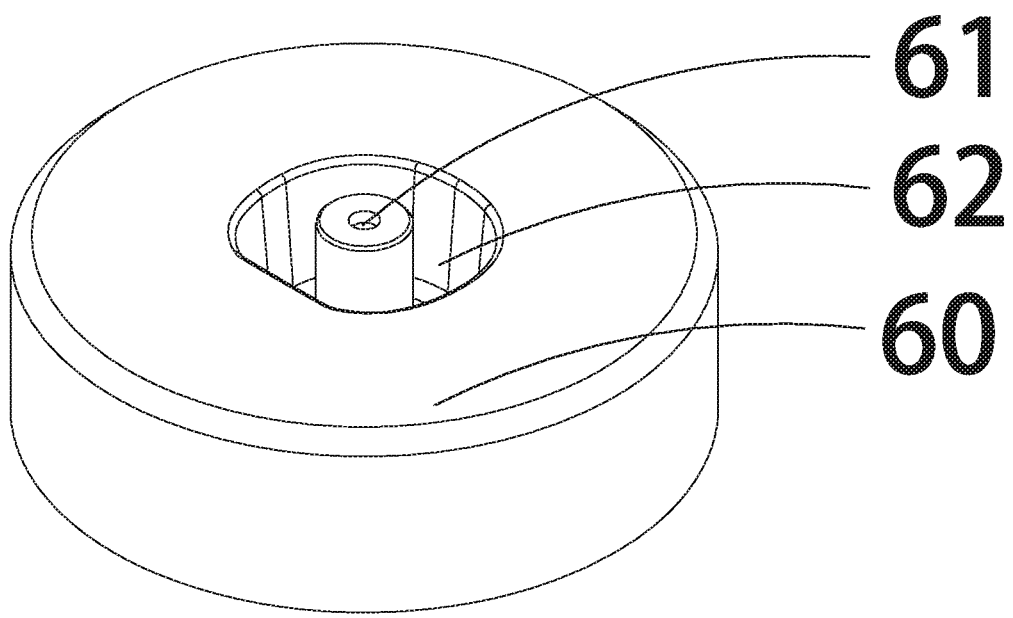
FIG. 16 is a structural schematic diagram of a charging base provided in an embodiment of the present application.
Figure 17:
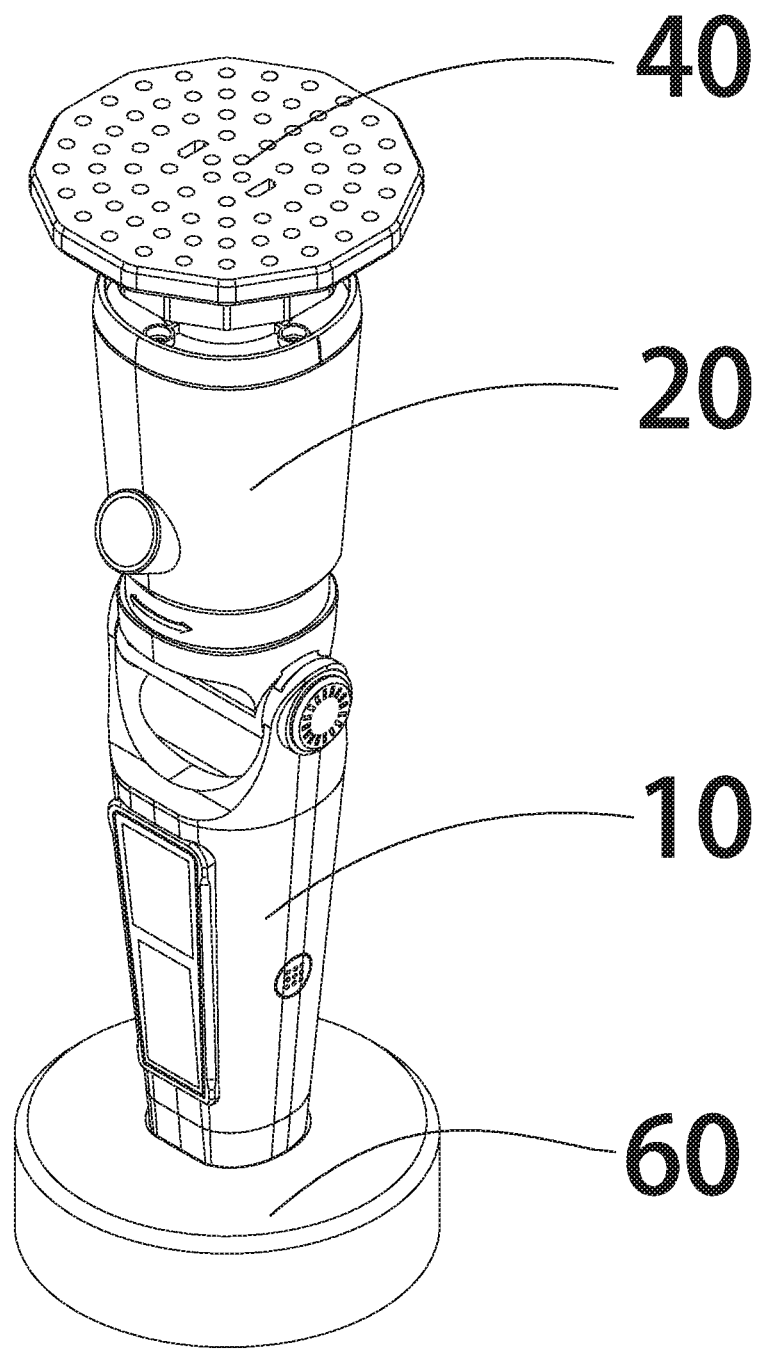
FIG. 17 is a schematic diagram of the charging base that charges the electric brush head provided in an embodiment of the present application.

Please refer to FIGS. 16 and 17, the electric brush head includes a charging base 60. The charging base 60 is connected to an external power source and can supply power to the entire electric brush head device through a paired plug. It is provided with a charging port 61 and a recess 62. The top charging port 17 of the control part 10 is paired and inserted into the recess 62, and the charging port 61 is configured to charge the electric brush head.

Figure 18:
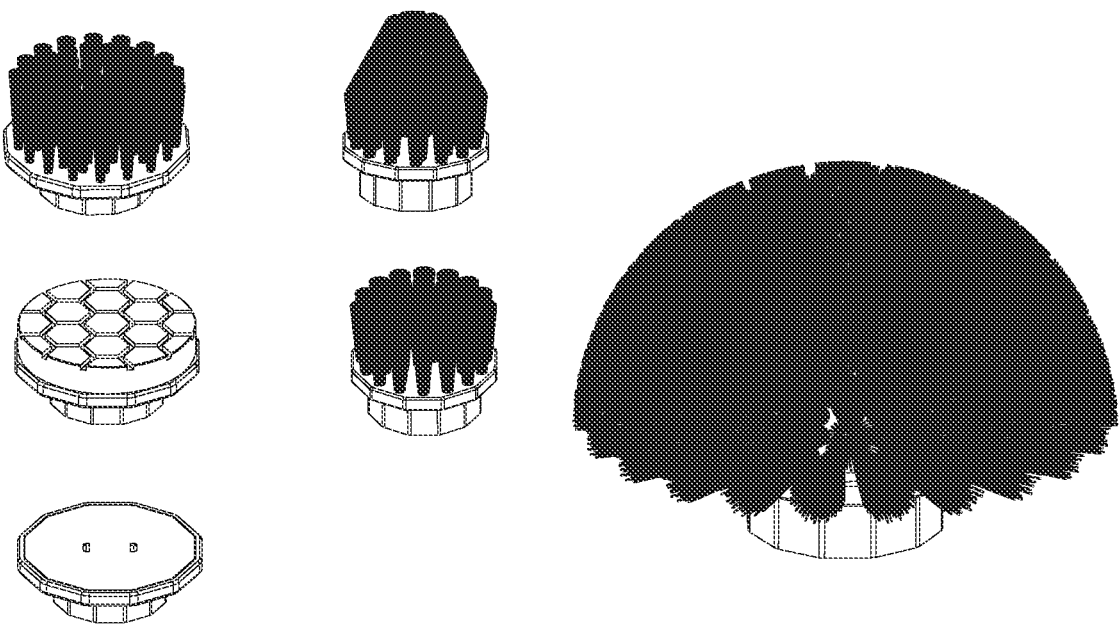
FIG. 18 is a schematic diagram of various work brush heads provided in an embodiment of the present application.
Figure 19:
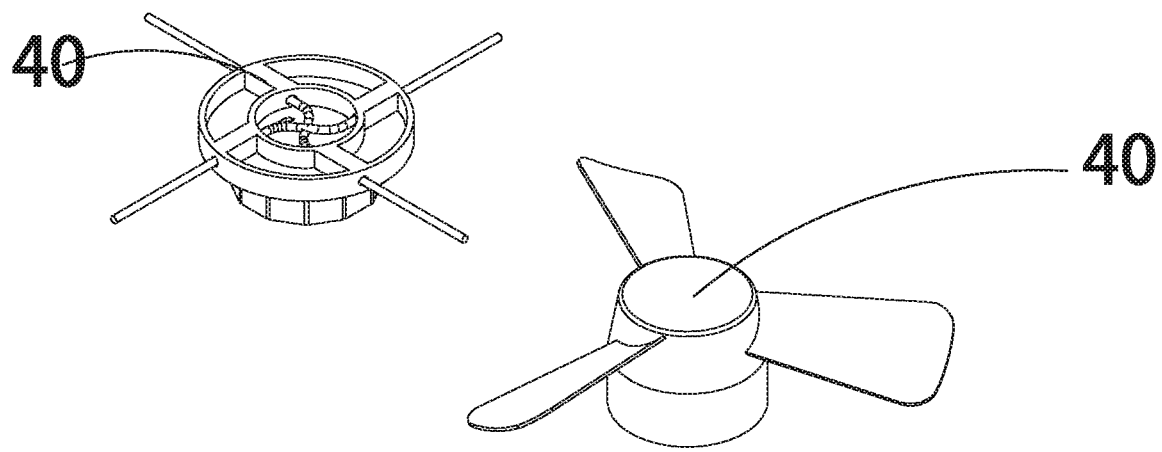
FIG. 19 is a schematic diagram of the brush heads belonging to different fields provided in an embodiment of the present application.

Please refer to FIGS. 18 and 19. The electric brush head can be replaced with different work brush heads 40 according to needs, and even replaced with different work brush heads 40 in different fields. The work brush head in the left side in FIG. 19 is a weeding work brush head, it can be used for weeding work; and the work brush head in the right side in FIG. 19 is a blade work brush head, it can be used for heat dissipation.

Figure 6:
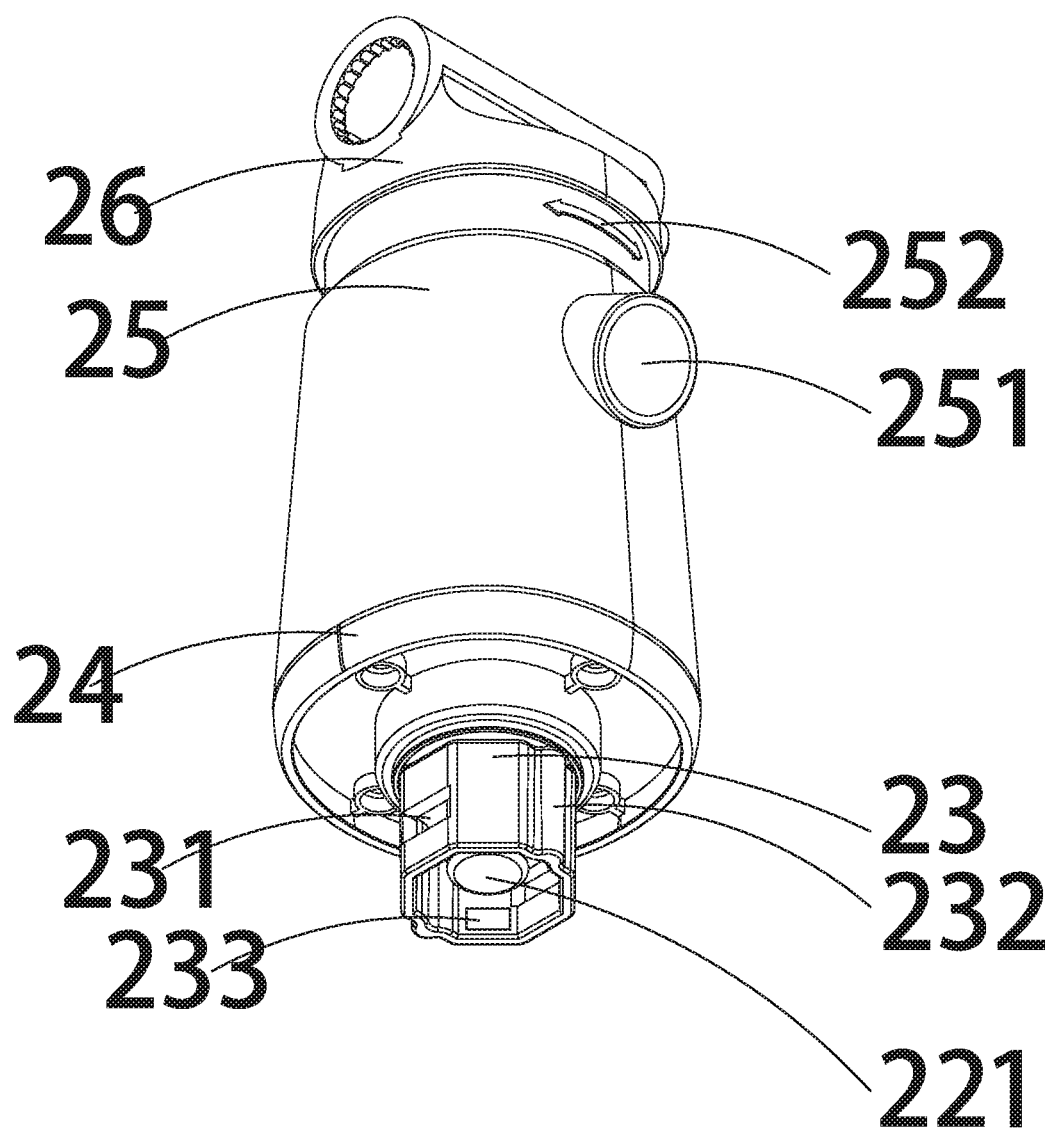
FIG. 6 is a first structural schematic diagram of an execution part provided in an embodiment of the present application.
Figure 7:
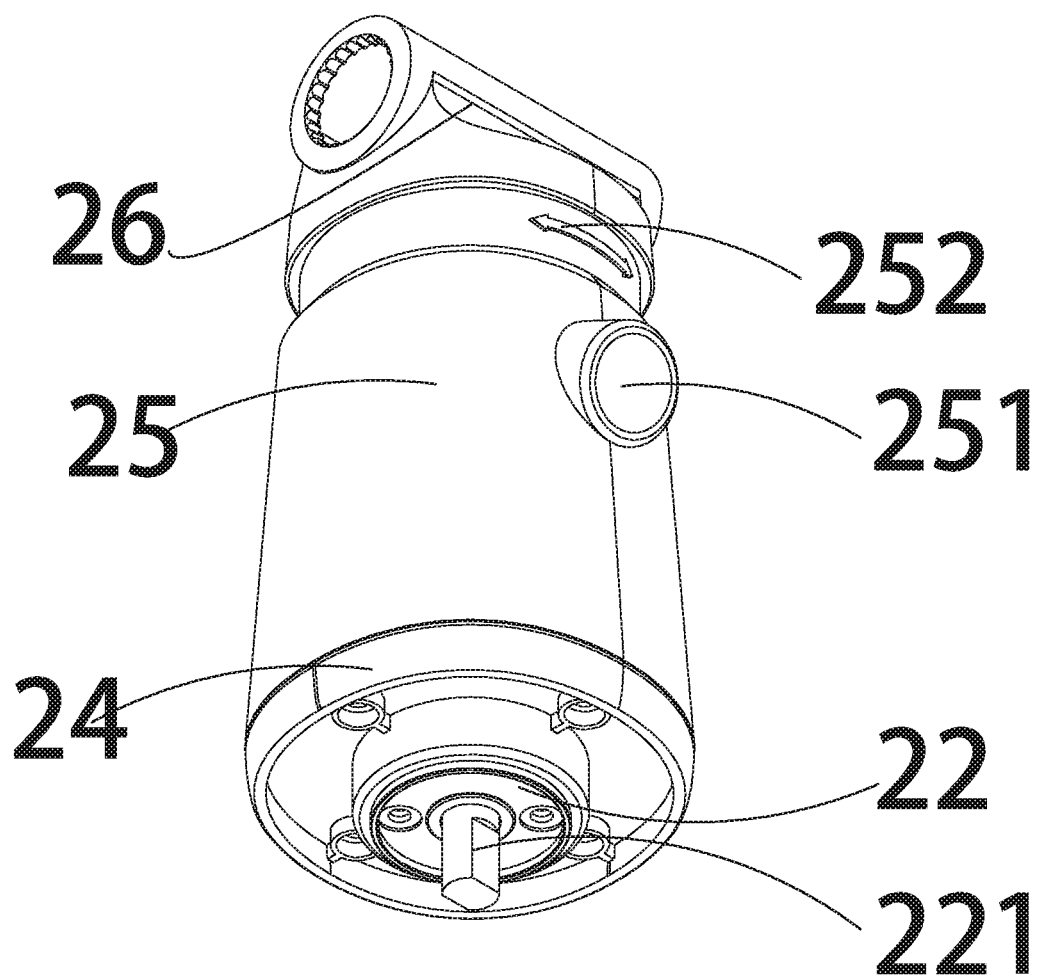
FIG. 7 is a second structural schematic diagram of the execution part provided in an embodiment of the present application.
Figure 8:
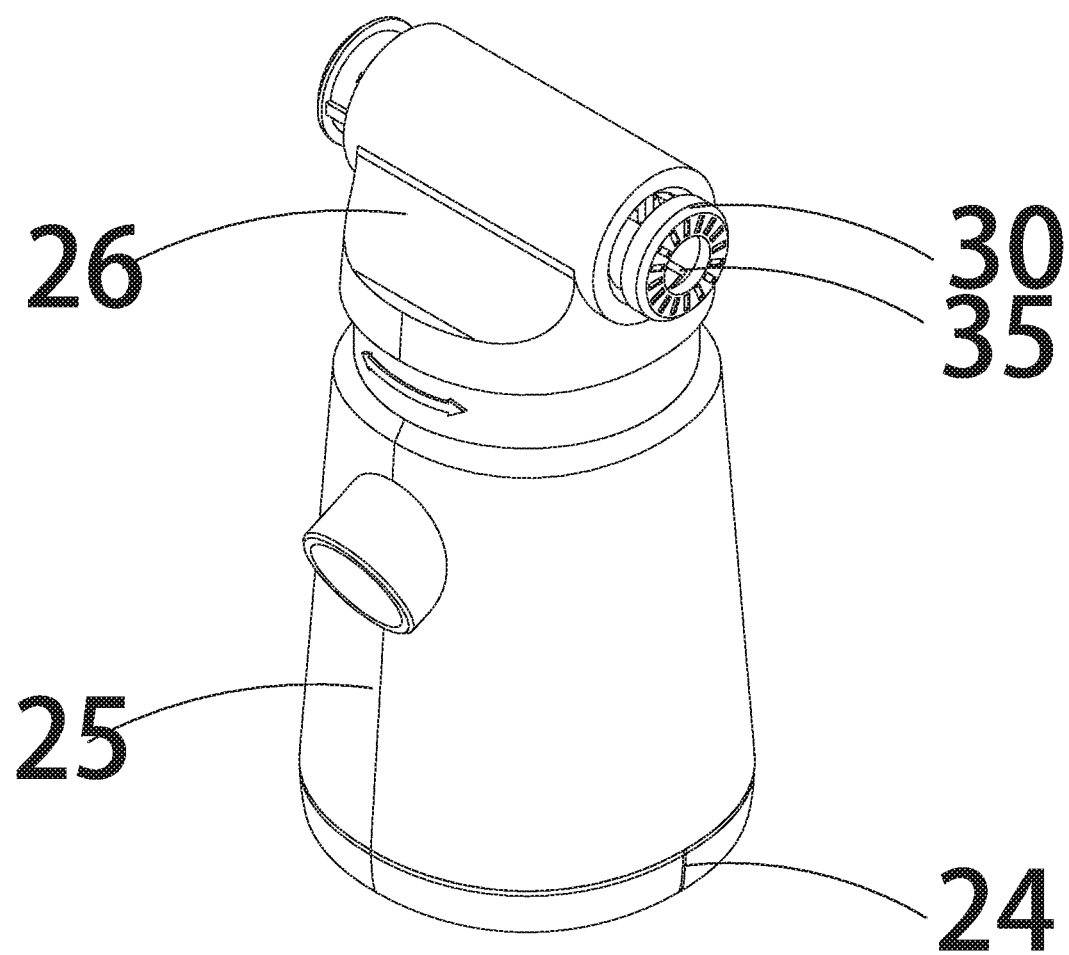
FIG. 8 is a structural schematic diagram of the fixing component with a self-rotation limit mechanism at a same side provided in an embodiment of the present application.
Figure 9:
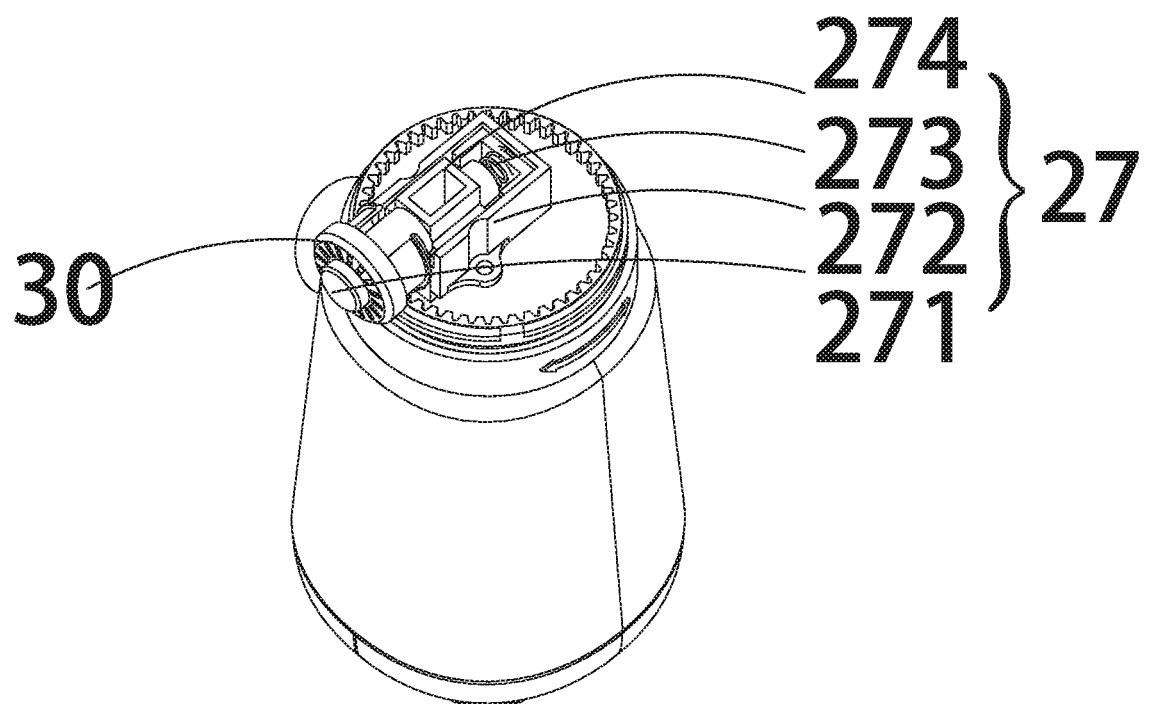
FIG. 9 is a structural schematic diagram of the self-rotation limit mechanism provided in an embodiment of the present application.
Figure 10:
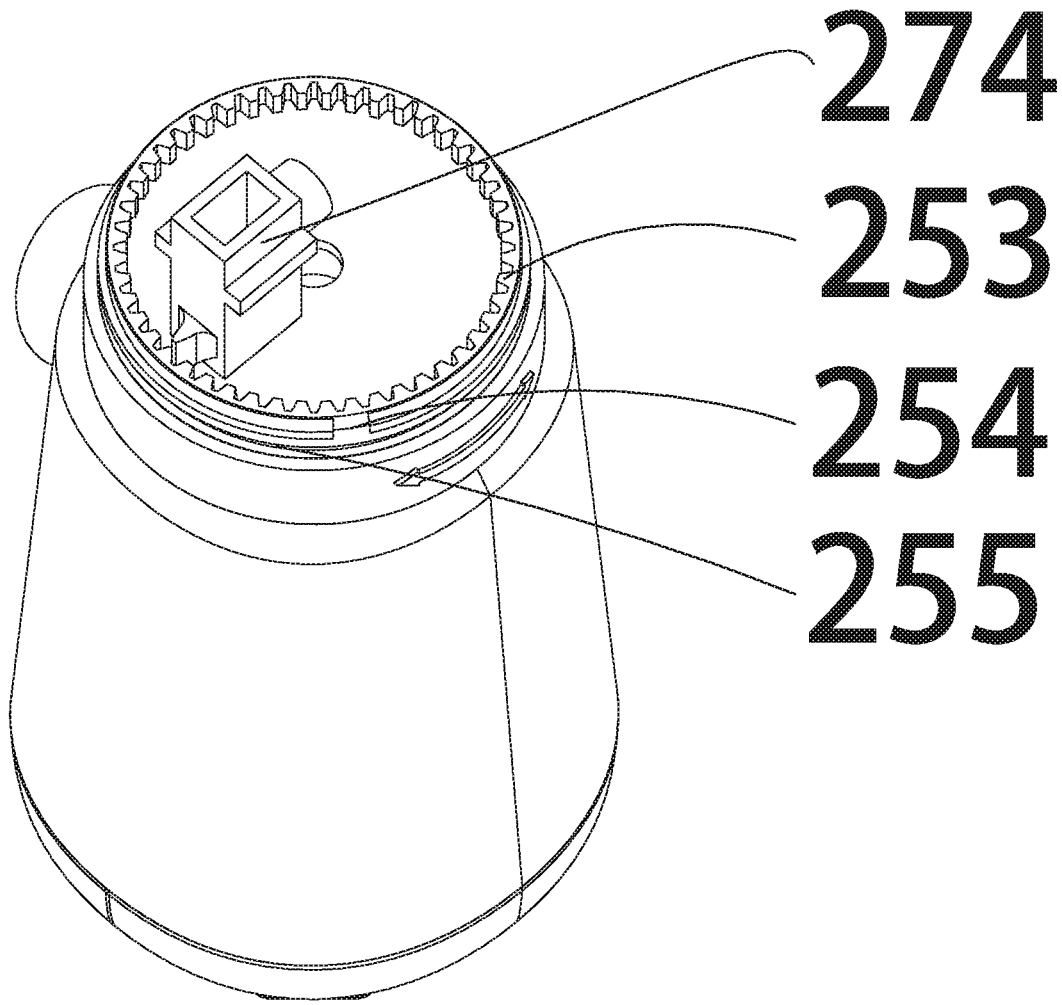
FIG. 10 is a structural schematic diagram of a top of an execution part body provided in an embodiment of the present application.
Figure 11:
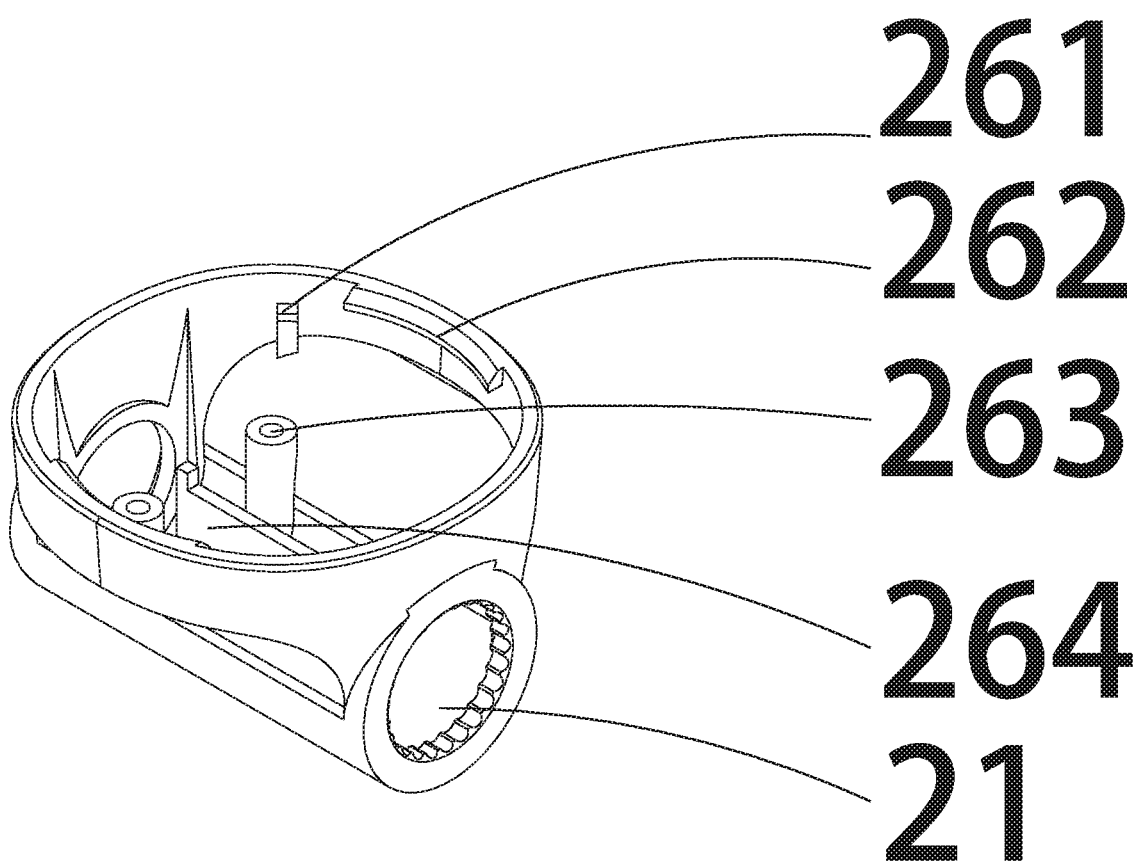
FIG. 11 is a structural schematic diagram of an execution part upper cover in an embodiment of the present application.

In the above embodiment, the fix connection element 23 and the work brush head 40 are fixedly connected via connection manners shown in FIGS. 6 and 13, that is, connected to the work brush head 40 through the bayonet 231, the positioning flange 232, and the first magnet 233. In other embodiments, connection can also be achieved through other manners, as shown in FIGS. 20 to 30. In other embodiments of the present application, various connection manners are also provided to fixedly connect the fix connection element 23 and the work brush head 40.

Figure 20:
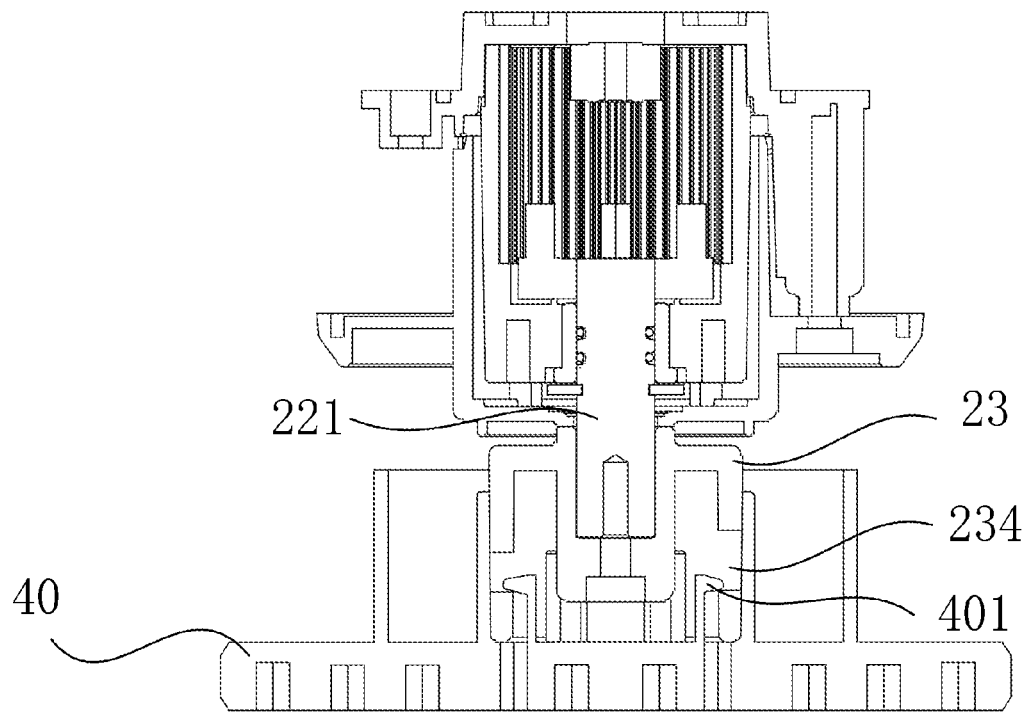
FIG. 20 is a cross-sectional view of a first connection manner between a fix connection element and the work brush head provided by the present application.

In an implementation, as shown in FIG. 20, the fix connection element 23 and the work brush head 40 can be fixedly connected through a buckle. An inner wall of the fix connection element 23 is provided with a slot 234, and the work brush head 40 is provided with a cavity. The cavity is provided with a hook 401, and when the fix connection element 23 is inserted into the cavity, the hook 401 is clamped into the slot 234, thereby fixing the fix connection element 23 and the work brush head 40.

Figure 21:
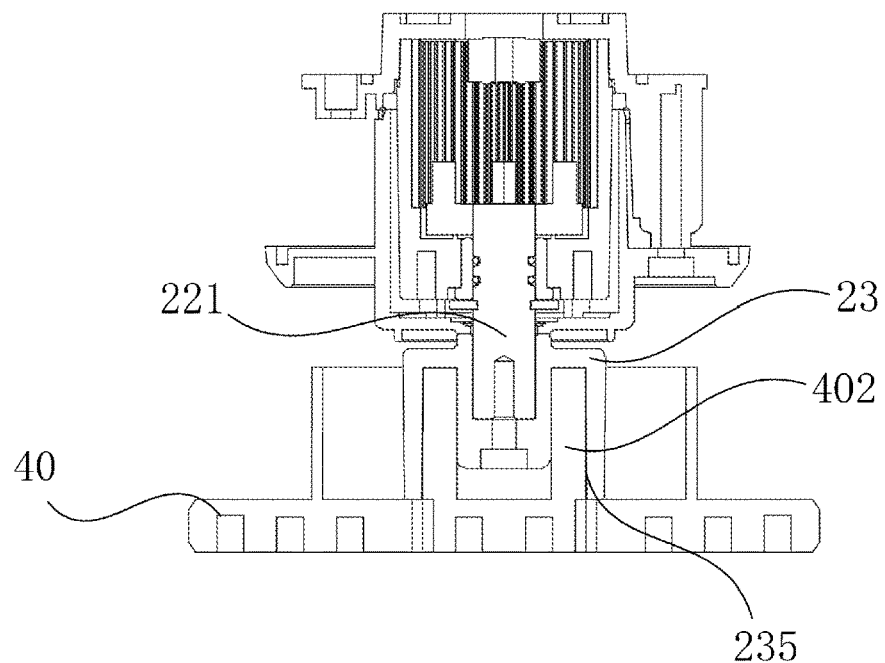
FIG. 21 is a cross-sectional view of a second connection manner between the fix connection element and the work brush head provided by the present application.

As shown in FIG. 21, in an implementation, the fix connection element 23 is provided with an insertion slot 235, and the work brush head 40 is provided with an insertion block 402. The insertion block 402 is inserted into the insertion slot 235 and is interference fit with the insertion slot 235, thereby fastening the insertion block 402 in the insertion slot 235 and securing a fix of the connection element 23 and the work brush head 40.

Figure 22:
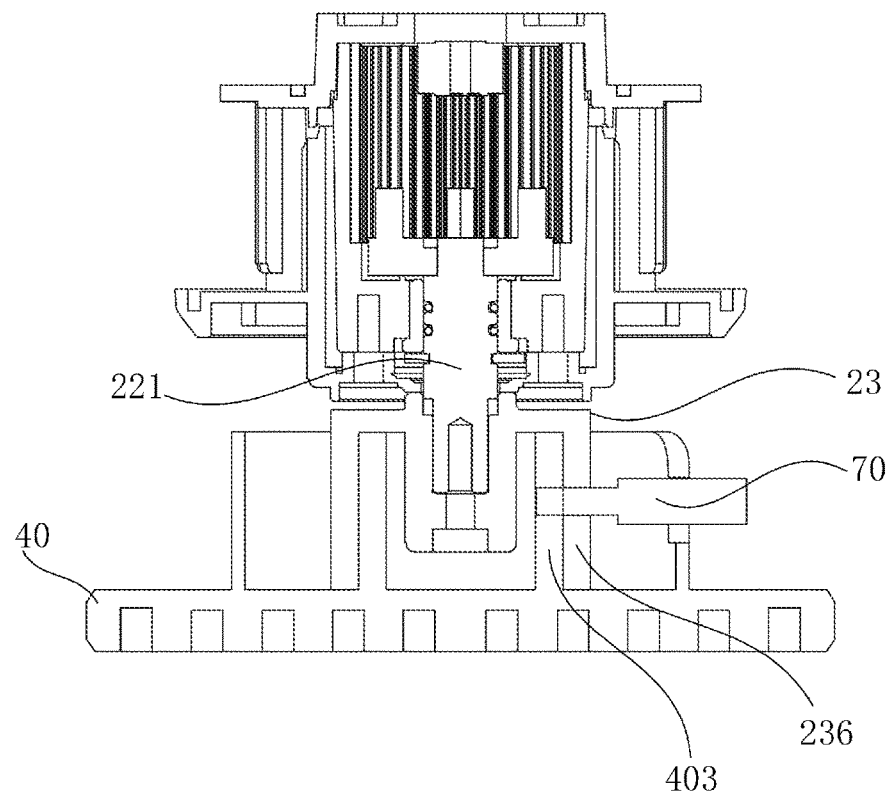
FIG. 22 is a cross-sectional view of a third connection manner between the fix connection element and the work brush head provided by the present application.

As shown in FIG. 22, in an implementation, the electric brush head further includes a fixed threaded rod 70, the fix connection element 23 is provided with an insertion slot, the work brush head 40 is provided with an insertion block 403, the insertion block 403 is inserted into the insertion slot. A slot wall 236 of the insertion slot on the fix connection element 23 and the insertion block 403 are both provided with a threaded hole, and the fixed threaded rod 70 is threaded connected to the threaded hole on the slot wall 236 of the insertion slot and the threaded hole on the insertion block 403, thereby fixing the fix connection element 23 and the work brush head 40.

Figure 23:
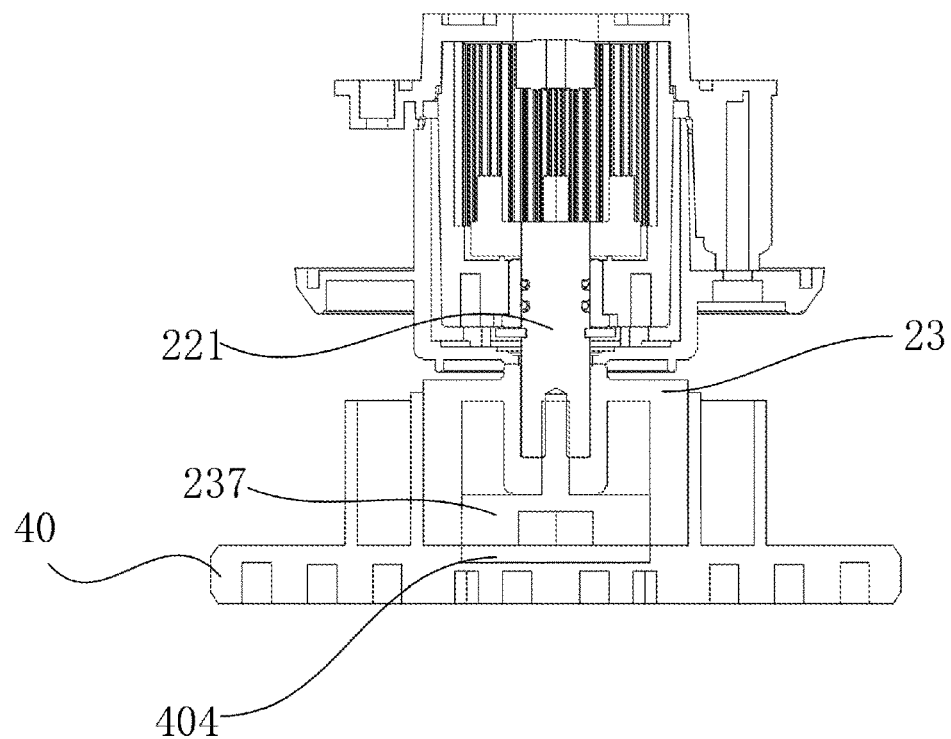
FIG. 23 is a cross-sectional view of a fourth connection manner between the fix connection element and the work brush head provided by the present application.

As shown in FIG. 23, in an implementation, an iron block 237 is provided on the fix connection element 23, and a magnet 404 is provided on the work brush head 40. The magnet 404 is magnetically attracted to the iron block 237, thereby fixing the fix connection element 23 and the work brush head 40.

Figure 24:
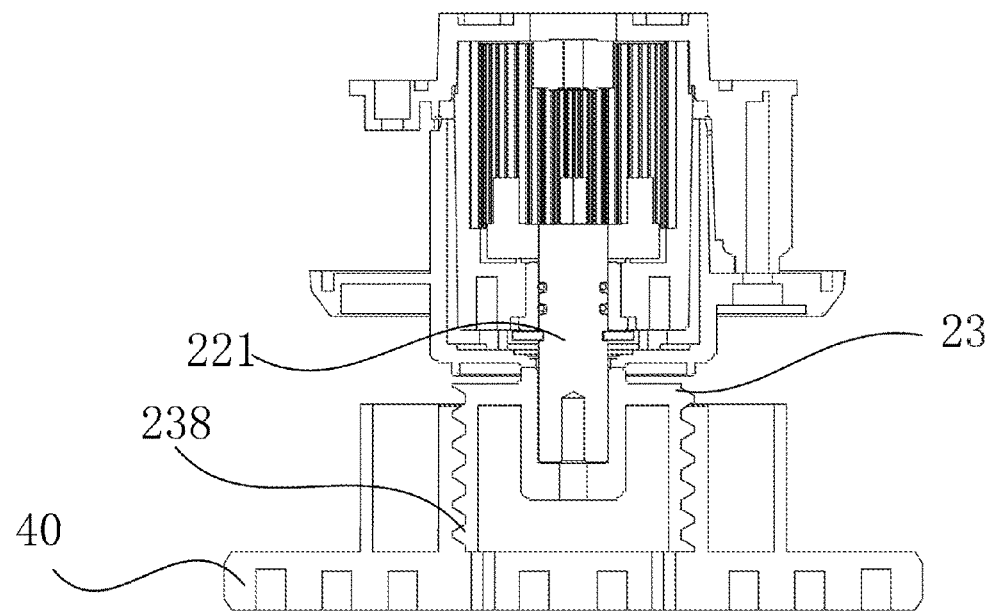
FIG. 24 is a cross-sectional view of a fifth connection manner between the fix connection element and the work brush head provided by the present application.

As shown in FIG. 24, in an implementation, an outer surface of the fix connection element 23 is provided with a thread 238, and the work brush head 40 is provided with a threaded hole. The fix connection element 23 is inserted into the threaded hole and threaded connected to the threaded hole, thereby fixing the fix connection element 23 and the work brush head 40.

Figure 25:
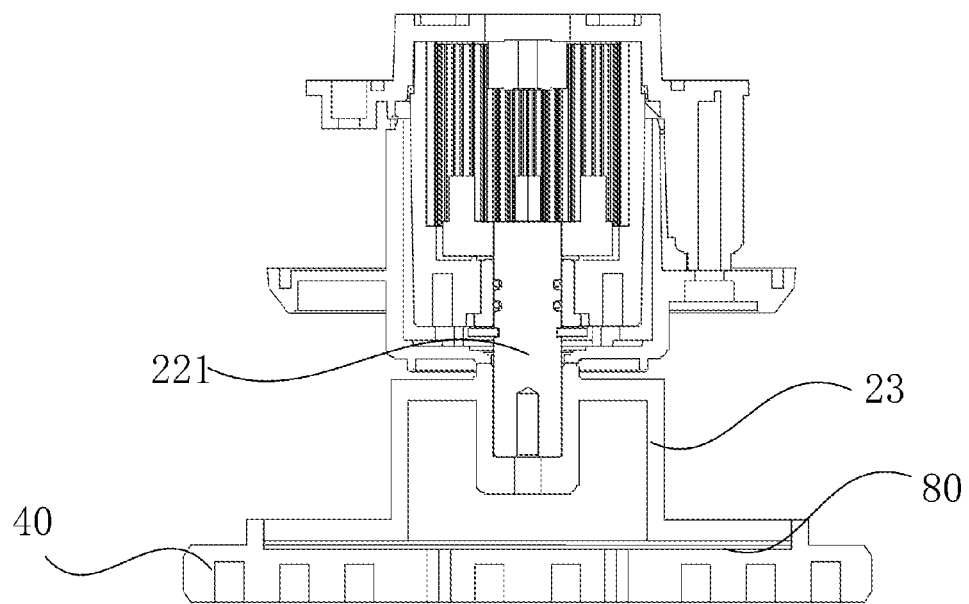
FIG. 25 is a cross-sectional view of a sixth connection manner between the fix connection element and the work brush head provided by the present application.

As shown in FIG. 25, in an implementation, the fix connection element 23 is fixedly connected to the work brush head 40 through a Velcro 80.

Figure 26:
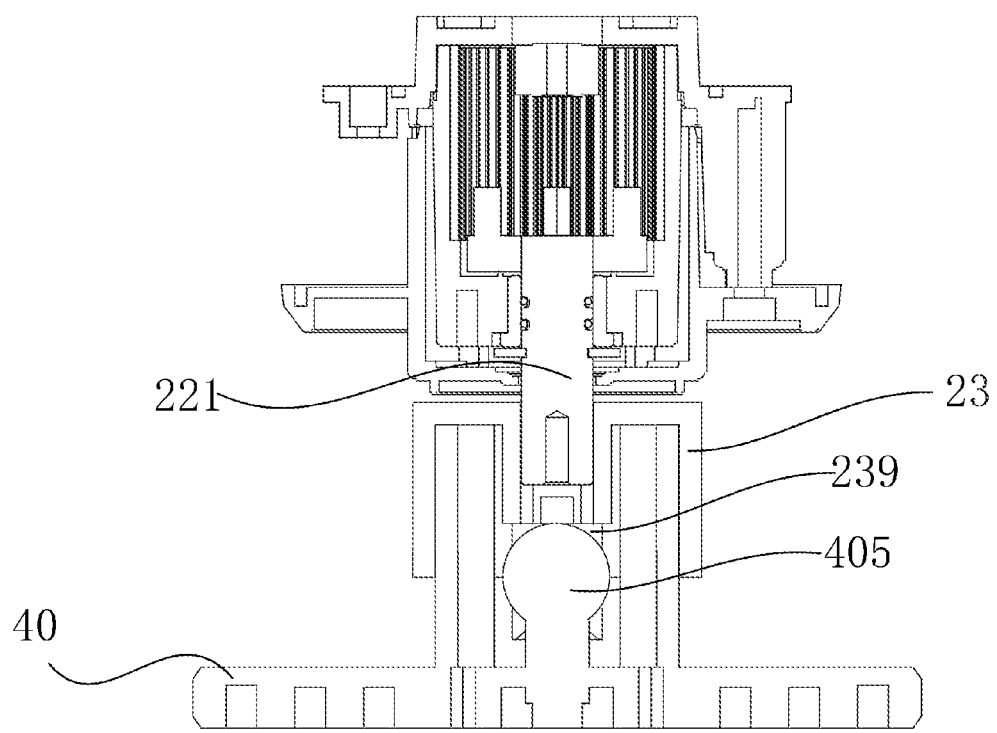
FIG. 26 is a cross-sectional view of a seventh connection manner between the fix connection element and the work brush head provided by the present application.

As shown in FIG. 26, in an implementation, the fix connection element 23 is provided with an accommodation slot 239, which includes an opening. The work brush head 40 is provided with a spherical buckle 405, the spherical buckle 405 is clamped into the accommodation slot 239. As shown in the drawing, it can be understood that an opening size of the accommodation slot 239 is smaller than a size of the spherical buckle 405. The fix connection element 23 has a certain elasticity, and the spherical buckle 405 is pushed into the opening of the accommodation slot 239 through an external force. During a pushing process, the opening is squeezed and pushed. When the spherical buckle 405 fully enters the accommodation slot 239, the opening is restored, thereby limiting the spherical buckle 405 in the accommodation slot 239, and fixing the fix connection element 23 and the work brush head 40.

Figure 27:
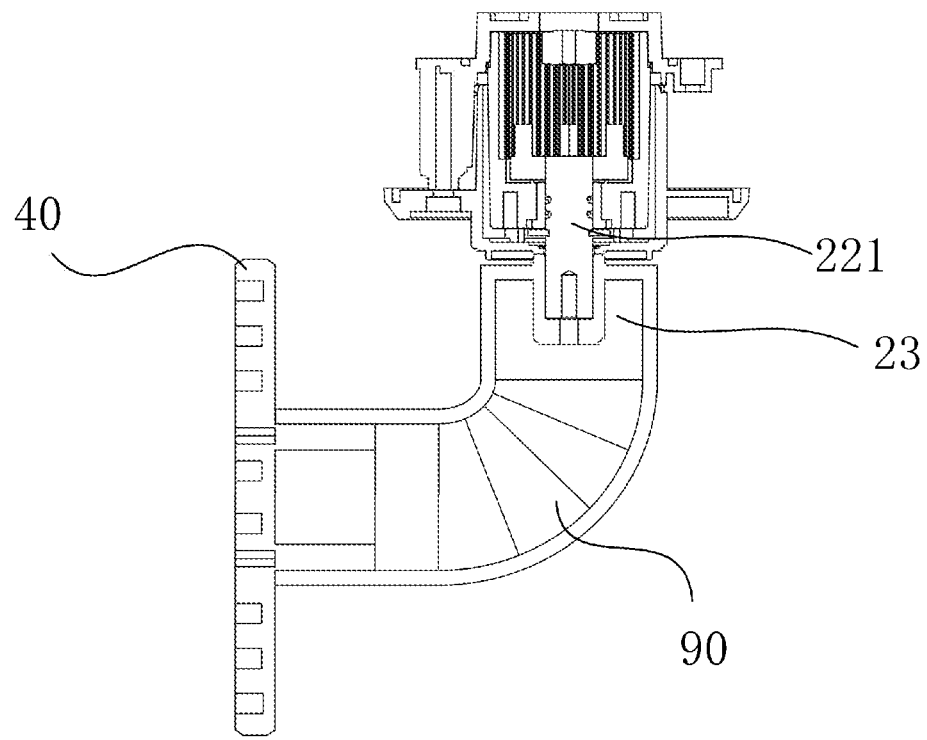
FIG. 27 is a cross-sectional view of an eighth connection manner between the fix connection element and the work brush head provided by the present application.

As shown in FIG. 27, in an implementation, the fix connection element 23 is fixedly connected to the work brush head 40 through an elbow tube 90.

Figure 28:
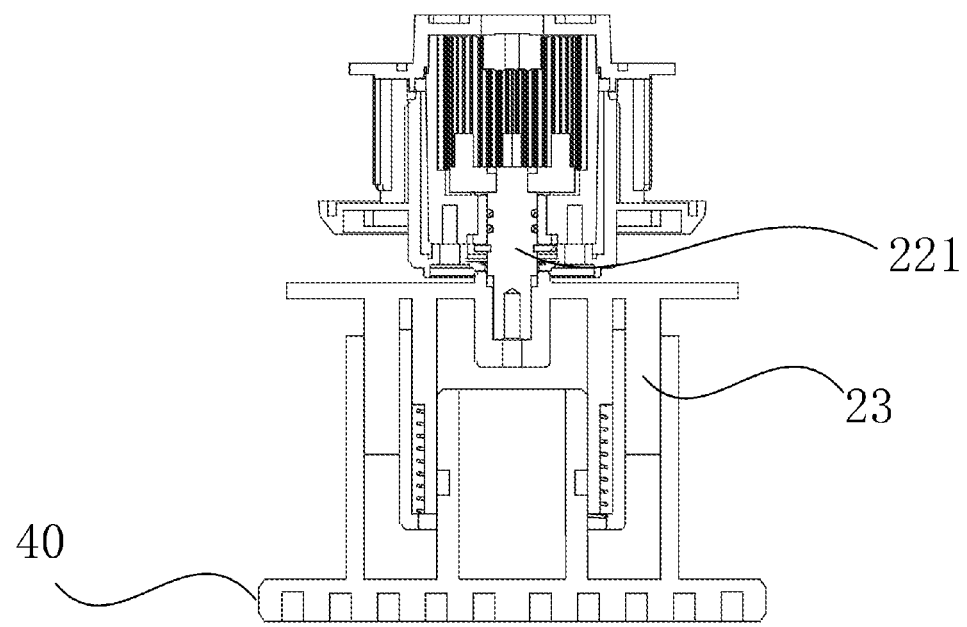
FIG. 28 is a cross-sectional view of a ninth connection manner between the fix connection element and the work brush head provided by the present application.

Or, as shown in FIG. 28, in an implementation, the work brush head 40 is directly sleeved on the fix connection element 23. This fixing manner is similar to that an electric screwdriver head is directly sleeved an electric screwdriver, thereby achieving a fixed connection between the two.

Figure 29:
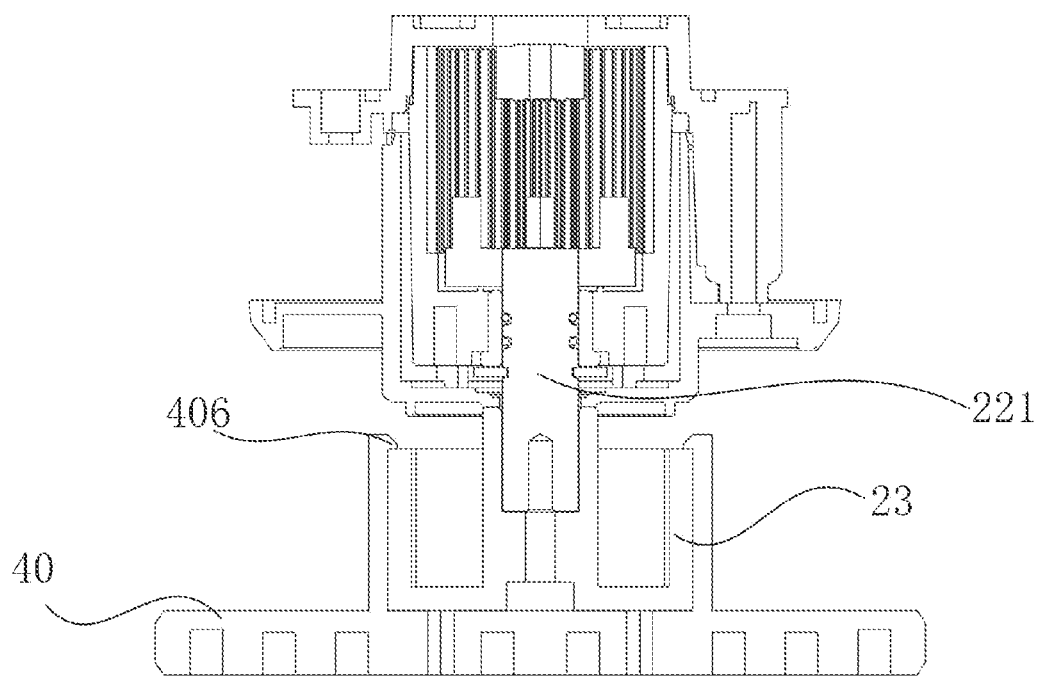
FIG. 29 is a cross-sectional view of a tenth connection manner between the fix connection element and the work brush head provided by the present application.

As shown in FIG. 29, in an implementation, the work brush head 40 is provided with a cavity, and a top surface of the cavity is provided with a buckle 406. When the fix connection element 23 is inserted into the cavity, the buckle 406 abuts against a bottom surface of the fix connection element 23, thereby fixing the fix connection element 23 and the work brush head 40.

Figure 30:
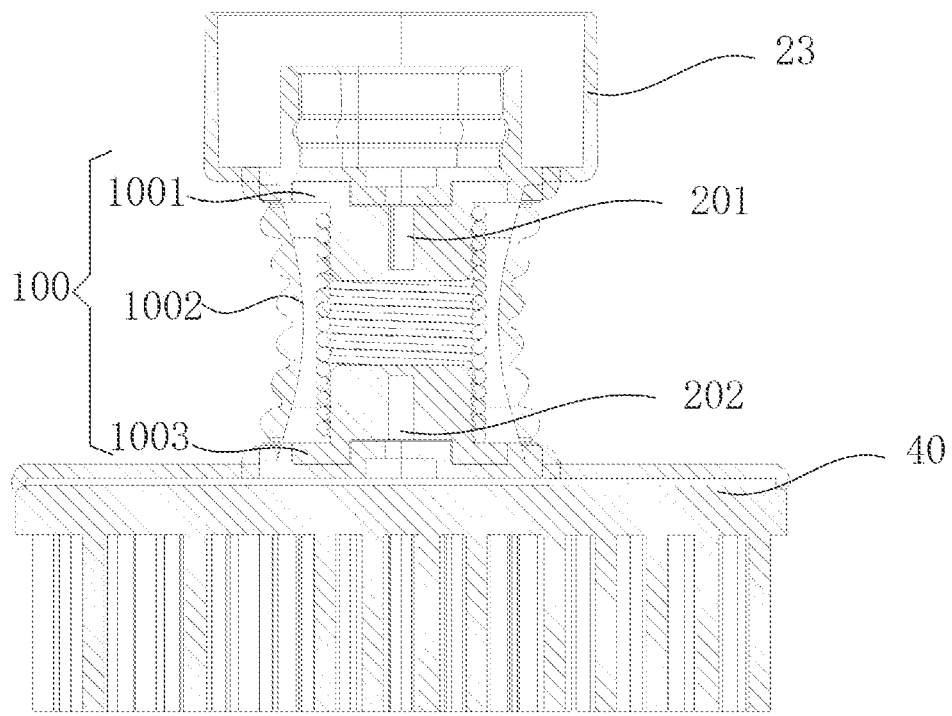
FIG. 30 is a cross-sectional view of an eleventh connection manner between the fix connection element and the work brush head provided by the present application.

As shown in FIG. 30, in an implementation, the fix connection element 23 is connected to the work brush head 40 through an elastic connector 100. Both the fix connection element 23 and the work brush head 40 are provided with a recess, the recess is provided with a threaded hole. Both ends of the elastic connector 100 are also provided with a threaded hole. One end of the elastic connector 100 is embedded in the recess of the fix connection element 23 and fixed to the fix connection element 23 through a bolt 201. The other end of the elastic connector 100 is embedded in the recess of the work brush head 40 and fixed to the work brush head 40 through a bolt 202, thereby achieving the fixation of the fix connection element 23 and the work brush head 40.

Where the elastic connector 100 includes a first end plate 1001, a spring 1002, and a second end plate 1003. The first end plate 1001 and the second end plate 1003 are fixed at both ends of the spring 1002, respectively. The first end plate 1001 and the second end plate 1003 serve as an elastic connector 100 at both ends, with a threaded hole provided on them. The first end plate 1001 is embedded in the recess of the fix connection element 23 and fixed to the fix connection element 23 through the bolt 201. The second end plate 1003 is embedded in the recess of the work brush head 40 and fixed to the work brush head 40 through the bolt 202. Through a flexible action of the spring 1002, the work brush head 40 can be twisted in different directions, rendering it is easy to use.

In other embodiments of the present application, the fix connection element 23 and the work brush head 40 can also be fixedly connected by other manner, such as being connected by a rotation buckle.

In an embodiment of the present disclosure, the electric brush head can be installed and disassembled with the telescopic rod 50 as needed, and the telescopic rod 50 can control the work state of the electric brush head. After disassembling the telescopic rod 50, the electric brush head can be held in hand for cleaning work to cope with cleaning a dead angle of the electric brush head after installing the telescopic rod. By a relative rotation of the control part 10 and the execution part 20, and a self-rotation of the execution part 20, a large clean range can be obtained, different work brush heads 40 can be replaced as needed to achieve a better clean result, or even work brush heads in different fields can be also replaced for working in different fields, and the application range of the electric brush head is expanded. The electric brush head can choose a suitable charging mode according to needs, either by connecting the TYPE-C and/or USB charging cable externally to the charging port inside the silicone block 101 on the control part 10, or by using the charging base 60 as the charging mode. The two charging modes can be selected according to different environments.

The above are only some embodiments of the present application and are not intended to limit the protection scope of the present application. For those skilled in the art, the present application may have various modifications and changes. Any modifications, improvements, or equivalent replacements made within the spirit and principles of the present application shall be included within the protection scope of the present application. It should be noted that similar reference number represent similar feature or element in the following drawings, so once a feature or element is defined in one drawing, further definition and explanation are not required in subsequent drawings.

What is claimed is:

1. An electric brush device, comprising:
   a control part configured to receive a handle;
   an execution part connected to the control part at an angle via a fixing component, wherein
      each of the execution part and the control part is rotatable with respect to each other,
      the execution part includes:
         an electric motor,
         an output shaft extending from the electric motor to drive a detachable work brush head,
         a self-rotation latch, and
         a self-rotation limit mechanism comprising a self-rotation limit clamp block having a latch, wherein the self-rotation limit mechanism is configured to lock a rotation of the execution part based on an engagement of the latch on the self-rotation limit clamp block with the self-rotation latch;
   a display configured to display information related to a work status of the electric brush device, wherein the display is a touch screen configured to receive touch instructions from a user; and
   a charging port configured to connect the electric brush device to an external power source.

2. The electric brush device of claim 1, wherein the execution part further comprises a fix connection element including a bayonet and a positioning flange, the fix connection element is attached to the output shaft, and the fix connection element is shaped to accommodate the detachable work brush head.

3. The electric brush device of claim 1, wherein the charging port is a USB port or a type-C port.

4. The electric brush device of claim 1, wherein the handle is electrically connected to the control part, and wherein the handle includes a button to electrically control the work status of the electric brush device.

5. The electric brush device of claim 1, wherein the display is further configured to indicate at least one of a power-on/off state of the electric brush device, a battery status of the electric brush device, or a rotation speed of the electric brush device.

6. The electric brush device of claim 1, wherein the charging port is further configured to receive a charging base.

7. The electric brush device of claim 1, wherein the control part further comprises a voice control module to receive voice commands from the user to control the work status of the electric brush device.

8. An electric brush device, comprising:
   a control part configured to receive a handle;
   an execution part, wherein
      the control part is rotatably connected to the execution part via a fixing component and forms an angle relative to the execution part,
      the control part is rotatable around an axis of the fixing component,
      the execution part includes:
         an electric motor,
         an output shaft extending from the electric motor to drive a detachable work brush head,
         a self-rotation latch,
         a self-rotation limit mechanism comprising a self-rotation limit clamp block having a latch, wherein the self-rotation limit mechanism is configured to lock a rotation of the execution part based on an engagement of the latch on the self-rotation limit clamp block with the self-rotation latch;
   a display configured to display information related to a work status of the electric brush device; and
   a charging port configured to connect the electric brush device to an external power source.

9. The electric brush device of claim 8, wherein the self-rotation limit mechanism is further configured to lock a relative position of the control part when the control part rotates.

10. The electric brush device of claim 8, wherein
    the execution part further comprises a fix connection element including a bayonet and a positioning flange,
    the fix connection element is attached to the output shaft, and
    the fix connection element is shaped to accommodate the detachable work brush head.

11. The electric brush device of claim 8, wherein the charging port is a USB port or a type-C port.

12. The electric brush device of claim 8,
    wherein the handle is electrically connected to the control part, and
    wherein the handle includes a button to electrically control the work status of the electric brush device.

13. The electric brush device of claim 8, wherein the display is further configured to indicate at least one of a power-on/off state of the electric brush device, a battery status of the electric brush device, or a rotation speed of the electric brush device.

14. The electric brush device of claim 8, wherein the charging port is further configured to receive a charging base.

15. The electric brush device of claim 8, wherein the display is a touch screen configured to receive touch instructions from a user.

16. The electric brush device of claim 8, wherein the control part further comprises a voice control module configured to receive voice commands from a user to control the work status of the electric brush device.

17. An electric brush device, comprising:
a control part configured to receive a handle;
an execution part connected to the control part at an angle via a fixing component, wherein
  each of the execution part and the control part is rotatable with respect to each other, and
  the execution part includes:
    an electric motor,
    an output shaft extending from the electric motor to drive a detachable work brush head,
    a self-rotation latch, and
    a self-rotation limit mechanism comprising a self-rotation limit clamp block having a latch, wherein the self-rotation limit mechanism is configured to lock a rotation of the execution part based on an engagement of the latch on the self-rotation limit clamp block with the self-rotation latch;
a fix connection element attached to the output shaft, wherein the fix connection element is shaped to accommodate the detachable work brush head;
a display configured to display information related to a work status of the electric brush device, wherein the display is a touch screen configured to receive touch instructions from a user; and
a charging port configured to connect the electric brush device to an external power source.

18. An electric brush device, comprising:
a control part configured to receive a handle;
an execution part, wherein
  the control part is rotatably connected to the execution part via a fixing component and forms an angle relative to the execution part,
  the control part is rotatable around an axis of the fixing component, and
  the execution part includes:
    an electric motor,
    an output shaft extending from the electric motor to drive a detachable work brush head,
    a self-rotation latch, and
    a self-rotation limit mechanism comprising a self-rotation limit clamp block having a latch, wherein
      the self-rotation limit mechanism is configured to lock a rotation of the execution part based on an engagement of the latch on the self-rotation limit clamp block with the self-rotation latch; and
    a fix connection element attached to the output shaft, wherein the fix connection element is shaped to accommodate the detachable work brush head; and
a charging port configured to connect to the electric brush device to an external power source.

19. The electric brush device of claim 18, further comprising a display configured to display information related to a work status of the electric brush device.

* * * * *